(12) United States Patent
Nagatomo et al.

(10) Patent No.: US 9,080,902 B2
(45) Date of Patent: Jul. 14, 2015

(54) FLOW METER DEVICE

(75) Inventors: Kenji Nagatomo, Kyoto (JP); Mitsuo Yokohata, Osaka (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 51 days.

(21) Appl. No.: 14/116,881

(22) PCT Filed: Apr. 18, 2012

(86) PCT No.: PCT/JP2012/002698
§ 371 (c)(1),
(2), (4) Date: Nov. 11, 2013

(87) PCT Pub. No.: WO2012/157188
PCT Pub. Date: Nov. 22, 2012

(65) Prior Publication Data
US 2014/0069204 A1    Mar. 13, 2014

(30) Foreign Application Priority Data
May 13, 2011    (JP) .................................. 2011-108009

(51) Int. Cl.
*G01F 1/00* (2006.01)
*F23N 5/18* (2006.01)
(Continued)

(52) U.S. Cl.
CPC . *G01F 1/00* (2013.01); *F23K 5/005* (2013.01); *F23N 5/18* (2013.01); *G01F 15/002* (2013.01); *G01F 15/075* (2013.01); *H01M 8/04089* (2013.01); *Y02E 60/50* (2013.01)

(58) Field of Classification Search
CPC .......... G01F 1/00; G01N 27/416; H01M 8/04
USPC .......... 73/198; 702/45; 324/434; 429/429, 23
See application file for complete search history.

(56) References Cited

U.S. PATENT DOCUMENTS

2002/0192520 A1* 12/2002 Nonobe ......................... 429/23
2008/0270045 A1    10/2008 Miyata et al.
(Continued)

FOREIGN PATENT DOCUMENTS

JP    2001-281089 A    10/2001
JP    2006-313114 A    11/2006
(Continued)

OTHER PUBLICATIONS

Extended European Search Report in corresponding European Application No. 12786227.4, dated Oct. 17, 2014, 8 pages.
(Continued)

*Primary Examiner* — Jewel V Thompson
(74) *Attorney, Agent, or Firm* — Brinks Gilson & Lione

(57) ABSTRACT

A gas meter of the present invention includes a flow measuring section for measuring a flow value of a gas flowing through a fluid passage connected to a gas instrument at each specified time interval; a measurement flow memory for storing the measured flow value; and a fuel cell determiner section for determining that the instrument using a gas is a fuel cell, when a condition A and a condition B are satisfied, in which the condition A is such that a maximum value of determination target flow values is equal to or less than a second predetermined value, the determination target flow values being a predetermined number of flow values measured before and after a reference flow value which is equal to or greater than a first predetermined value and is closest to the first predetermined value, the determination target flow values being included in stored flow values, and the condition B is such that a difference value derived by subtracting from each of all of the determination target flow values, an average value found from the each determination target flow value and a predetermined number of measurement flow values measured before the each determination target flow value, is equal to or less than a third predetermined value.

4 Claims, 19 Drawing Sheets

(51) Int. Cl.
*H01M 8/04* (2006.01)
*G01F 15/00* (2006.01)
*G01F 15/075* (2006.01)
*F23K 5/00* (2006.01)

(56) References Cited

U.S. PATENT DOCUMENTS

| | | | |
|---|---|---|---|
| 2010/0291451 A1* | 11/2010 | Tamura et al. | 429/429 |
| 2011/0178732 A1 | 7/2011 | Iwamoto | |
| 2011/0318659 A1* | 12/2011 | Tatsui et al. | 429/423 |
| 2011/0320141 A1 | 12/2011 | Yokohata et al. | |
| 2012/0221259 A1 | 8/2012 | Yokohata | |
| 2013/0149623 A1* | 6/2013 | Nakamura et al. | 429/429 |
| 2013/0312513 A1* | 11/2013 | Yokohata et al. | 73/198 |
| 2014/0247053 A1* | 9/2014 | Jeong et al. | 324/434 |

FOREIGN PATENT DOCUMENTS

| | | |
|---|---|---|
| JP | 2008-107262 A | 5/2008 |
| JP | 2008-196991 A | 8/2008 |
| JP | 2008-309498 A | 12/2008 |

OTHER PUBLICATIONS

International Search Report for International Application No. PCT/JP2012/002698, dated Jul. 17, 2012, 2 pages.

\* cited by examiner

Fuel cell

| Measurement flow value | Difference value | Measurement code |
|---|---|---|
| 38.611 | 38.611 | 4 |
| 42.812 | 4.201 | 1 |
| 45.557 | 2.745 | 1 |
| 47.839 | 2.282 | 1 |
| 48.665 | 0.826 | 1 |
| 49.391 | 0.726 | 1 |
| 49.887 | 0.496 | 1 |
| 50.461 | 0.574 | 1 |
| 50.799 | 0.338 | 1 |
| 51.267 | 0.468 | 1 |
| 51.448 | 0.181 | 1 |
| 52.179 | 0.731 | 1 |
| 52.776 | 0.597 | 1 |
| 53.221 | 0.445 | 1 |
| 53.583 | 0.362 | 1 |

Fig. 1

Stove burner

| Measurement flow value | Difference value | Measurement code |
|---|---|---|
| 39.281 | 39.281 | 4 |
| 47.958 | 8.677 | 1 |
| 50.948 | 2.990 | 1 |
| 49.742 | -1.206 | 1 |
| 50.389 | 0.647 | 1 |
| 49.854 | -0.535 | 1 |
| 49.820 | -0.034 | 1 |
| 50.016 | 0.196 | 1 |
| 49.884 | -0.132 | 1 |
| 49.969 | 0.085 | 1 |
| 49.751 | -0.218 | 1 |
| 49.717 | -0.034 | 1 |
| 49.880 | 0.163 | 1 |
| 50.034 | 0.154 | 1 |
| 49.890 | -0.144 | 1 |

Fig. 2

| n | Measurement flow value Q(n) | Difference value ΔQ(n) | Measurement code |
|---|---|---|---|
| 1 | 0 | 0 | 0 |
| 2 | 90 | 90 | 7 |
| 3 | 145 | 55 | 6 |
| 4 | 150 | 5 | 1 |
| 5 | 158 | 8 | 1 |
| 6 | 208 | 50 | 5 |
| 7 | 203 | −5 | 1 |
| 8 | 204 | 1 | 1 |
| 9 | 204 | 0 | 1 |
| 10 | 204 | 0 | 1 |
| 11 | 204 | 0 | 1 |
| 12 | 204 | 0 | 1 |
| 13 | 204 | 0 | 1 |
| 14 | 203 | −1 | 1 |
| 15 | 204 | 1 | 1 |
| 16 | 204 | 0 | 1 |

Fig. 5

| Measurement flow value (n) | Difference value ΔQ(n) | Code |
|---|---|---|
| $Q(n) \neq 0$ | $400 < \lvert \Delta Q(n) \rvert$ | F |
| | $300 < \lvert \Delta Q(n) \rvert \leq 400$ | E |
| | $250 < \lvert \Delta Q(n) \rvert \leq 300$ | D |
| | $200 < \lvert \Delta Q(n) \rvert \leq 250$ | C |
| | $175 < \lvert \Delta Q(n) \rvert \leq 200$ | B |
| | $150 < \lvert \Delta Q(n) \rvert \leq 175$ | A |
| | $125 < \lvert \Delta Q(n) \rvert \leq 150$ | 9 |
| | $100 < \lvert \Delta Q(n) \rvert \leq 125$ | 8 |
| | $75 < \lvert \Delta Q(n) \rvert \leq 100$ | 7 |
| | $50 < \lvert \Delta Q(n) \rvert \leq 75$ | 6 |
| | $40 < \lvert \Delta Q(n) \rvert \leq 50$ | 5 |
| | $30 < \lvert \Delta Q(n) \rvert \leq 40$ | 4 |
| | $20 < \lvert \Delta Q(n) \rvert \leq 30$ | 3 |
| | $10 < \lvert \Delta Q(n) \rvert \leq 20$ | 2 |
| | $\lvert \Delta Q(n) \rvert \leq 10$ | 1 |
| $Q(n) = 0$ | Flow zero | 0 |

Fig. 6

| n | Measurement flow value Q(n) | Difference value ΔQ(n) | Measurement code | Moving average Q(n)' | Q(n) − Q(n)' |
|---|---|---|---|---|---|
| 1 | 11.173 | | | | |
| 2 | 16.226 | | | | |
| 3 | 20.115 | | | 18.171 | 1.945 |
| 4 | 25.314 | | | 22.715 | 2.600 |
| 5 | 30.583 | | | 27.949 | 2.635 |
| 6 | 34.369 | | | 32.476 | 1.893 |
| 7 | 38.611 | 38.611 | 4 | 36.490 | 2.121 |
| 8 | 42.812 | 4.201 | 1 | 40.712 | 2.101 |
| 9 | 45.557 | 2.745 | 1 | 44.185 | 1.373 |
| 10 | 47.839 | 2.282 | 1 | 46.698 | 1.141 |
| 11 | 48.665 | 0.826 | 1 | 48.252 | 0.413 |
| 12 | 49.391 | 0.726 | 1 | 49.028 | 0.363 |
| 13 | 49.887 | 0.496 | 1 | 49.639 | 0.248 |
| 14 | 50.461 | 0.574 | 1 | 50.174 | 0.287 |
| 15 | 50.799 | 0.338 | 1 | 50.630 | 0.169 |
| 16 | 51.267 | 0.468 | 1 | 51.033 | 0.234 |
| 17 | 51.448 | 0.181 | 1 | 51.358 | 0.090 |
| 18 | 52.179 | 0.731 | 1 | 51.814 | 0.365 |
| 19 | 52.776 | 0.597 | 1 | 52.478 | 0.298 |
| 20 | 53.221 | 0.445 | 1 | 52.999 | 0.222 |
| 21 | 53.583 | 0.362 | 1 | 53.402 | 0.181 |
| 22 | 53.898 | 0.315 | 1 | | |

| Sum of Q(n) − Q(n)' of Nos. 3 to 21 | 18.679 |
|---|---|

Fig. 9

| n | Measurement flow value Q(n) | Difference value ΔQ(n) | Measurement code | Moving average Q(n)' | Q(n) − Q(n)' |
|---|---|---|---|---|---|
| 1 | 0.000 | | | | |
| 2 | 0.000 | | | | |
| 3 | 0.000 | | | 0.000 | 0.000 |
| 4 | 0.000 | | | 0.000 | 0.000 |
| 5 | 0.000 | | | 0.000 | 0.000 |
| 6 | 0.000 | | | 0.000 | 0.000 |
| 7 | 39.281 | 39.281 | 4 | 19.641 | 19.641 |
| 8 | 47.958 | 8.677 | 1 | 43.620 | 4.339 |
| 9 | 50.948 | 2.990 | 1 | 49.453 | 1.495 |
| 10 | 49.742 | −1.206 | 1 | 50.345 | 0.603 |
| 11 | 50.389 | 0.647 | 1 | 50.066 | 0.324 |
| 12 | 49.854 | −0.535 | 1 | 50.122 | 0.267 |
| 13 | 49.820 | −0.034 | 1 | 49.837 | 0.017 |
| 14 | 50.016 | 0.196 | 1 | 49.918 | 0.098 |
| 15 | 49.884 | −0.132 | 1 | 49.950 | 0.066 |
| 16 | 49.969 | 0.085 | 1 | 49.927 | 0.042 |
| 17 | 49.751 | −0.218 | 1 | 49.860 | 0.109 |
| 18 | 49.717 | −0.034 | 1 | 49.734 | 0.017 |
| 19 | 49.880 | 0.163 | 1 | 49.799 | 0.081 |
| 20 | 50.034 | 0.154 | 1 | 49.957 | 0.077 |
| 21 | 49.890 | −0.144 | 1 | 49.962 | 0.072 |
| 22 | 50.002 | 0.112 | 1 | | |

| Sum of Q(n) − Q(n)' of Nos. 3 to 21 | 27.248 |
|---|---|

Fig. 10

| n | Measurement flow value Q(n) | Difference value ΔQ(n) | Measurement code |
|---|---|---|---|
| 1 | 0 | 0 | 0 |
| 2 | 30 | 30 | 3 |
| 3 | 100 | 70 | 6 |
| 4 | 100 | 0 | 1 |
| 5 | 100 | 0 | 1 |
| 6 | 100 | 0 | 1 |
| 7 | 100 | 0 | 1 |
| 8 | 100 | 0 | 1 |
| 9 | 100 | 0 | 1 |
| 10 | 100 | 0 | 1 |
| 11 | 100 | 0 | 1 |
| 12 | 100 | 0 | 1 |
| 13 | 100 | 0 | 1 |
| 14 | 100 | 0 | 1 |
| 15 | 100 | 0 | 1 |
| 16 | 100 | 0 | 1 |

FLOW METER DEVICE

This application is a 371 application of PCT/JP2012/002698 having an international filing date of Apr. 18, 2012, which claims priority to JP2011-108009 filed May 13, 2011, the entire contents of which are incorporated herein by reference.

TECHNICAL FIELD

The present invention relates to a technique for correctly determining an instrument which uses a fluid based on a change in a flow (rate) of the fluid.

BACKGROUND ART

Conventionally, a gas meter device has been developed, which is capable of identifying an instrument which uses a gas in a fluid pipe system including the gas meter device. As such a gas meter device, for example, there is a gas meter device 100 disclosed in Patent Literature 1. A configuration of the gas meter device 100 will be described with reference to FIG. 21. FIG. 21 is a block diagram showing a schematic configuration of the gas meter device 100 according to a prior art.

As shown in FIG. 21, the gas meter device 100 includes a fluid passage 106 communicated with a home gas supply pipe (gas fluid passage 119). The gas meter device 100 further includes a memory 105, a gas shut-off valve 102, a flow measuring section 103, a calculating section 104, a comparator/determiner section 107, and a control circuit 116.

That is, in the gas meter device 100, the memory 105 preserves (contains) change determination values which are information as a criterion used to determine changes in gas use states of gas instruments 113 to 115.

The flow measuring section 103 measures a flow (flow rate) of the gas flowing through the fluid passage 106 at specified time intervals, and the calculating section 104 calculates a difference value of the measured flow value. Then, the comparator/determiner section 107 compares the difference value calculated by the calculating section 104 to the change determination values preserved in the memory 105 to determine the use state of any one of the gas instruments 113 to 115. The calculating section 104, the comparator/determiner section 107, and the gas shut-off valve 102 are controlled by the control circuit 116.

As described above, in the gas meter device 100, the calculating section 104 calculates the difference value of the instantaneous flow output from the flow measuring section 103 and determines the use state of any one of the gas instruments 113 to 115 based on a change amount of the difference value. The gas meter device 100 is configured to compare a change in the difference value of the measured gas flow to the change determination values preserved in the memory 105, to determine that the gas instrument using the gas is any one of the gas instruments 113 to 115.

As a gas meter device which determines the gas instrument using the gas, there is a gas meter device 200 disclosed in Patent Literature 2. A configuration of the gas meter device 200 disclosed in Patent Literature 2 will be described with reference to FIG. 22. FIG. 22 is a block diagram showing a schematic configuration of the gas meter device 200 according to a prior art.

As shown in FIG. 22, the gas meter device 200 includes a fluid passage 202 communicated with a gas pipe 216. The gas meter device 200 further includes a shut-off valve 222, a flow measuring section 204, a calculating section 208, a flow range division table preserving section 210, a difference value converting section 212, a code string generating section 214, an instrument determiner section 216, an instrument unique code string information preserving section 218, and an individual instrument flow calculating section 220. In the gas meter device 200, the calculating section 208 calculates a difference value at each specified time interval of the gas flow measured by the flow measuring section 204, and transmits the calculated difference value to the difference value converting section 212. Receiving the calculated difference value from the calculating section 208, the difference value converting section 212 converts the difference value at each specified time interval, into a code representing a specified flow range of divided flow ranges, with reference to a flow range division table 210a stored in the flow range division table preserving section 210. The code string generating section 214 generates a measurement code string which is the code string obtained by the difference value converting section 212. The measurement code string is change pattern information representing the change pattern of the flow of the fluid (gas) in a pseud manner. The instrument determiner section 216 compares the code string generated by the code string generating section 214 to instrument unique code strings unique to the instruments, which are stored in the instrument unique code string information preserving section 218, and determines that the gas instrument using the gas is any one of the gas instruments 213 to 215.

As described above, the gas meter device 200 disclosed in Patent Literature 2 is configured to determine the gas instrument using the gas, using an encoded value (code) derived by converting the difference value of the measured gas flow. This makes it possible to improve a calculation speed and an instrument determination accuracy while reducing a memory volume required for calculation performed when determining the gas instrument using the gas.

Patent Literature 1: Japanese Laid-Open Patent Application Publication No. 2006-313114
Patent Literature 2: Japanese Laid-Open Patent Application Publication No. 2008-309498

SUMMARY OF THE INVENTION

Technical Problem

However, the above mentioned configuration of the conventional gas meter device has a problem that a change pattern of the flow value of the fluid which increases gradually at a time point of starting of activation of a fuel cell, cannot be identified, and misdetermination may occur.

The present invention has been made in view of the above stated problem, and an object of the present invention is to provide a flow meter device which is capable of accurately determining whether or not an instrument using a fluid is a fuel cell.

Solution to Problem

To solve the problem associated with the prior art, there is provided a flow meter device for measuring a flow value of a fluid used in an instrument, comprising: a flow measuring section for measuring the flow value of the fluid flowing through a fluid passage connected to the instrument at each specified time interval; a flow memory for storing the flow value of the fluid which is measured by the flow measuring section; and a fuel cell determiner unit for determining that the instrument using the fluid is a fuel cell, when a condition A and a condition B are satisfied, in which the condition A is such that a maximum value of determination target flow values is equal to or less than a second predetermined value, the determination target flow values being a predetermined number of flow values measured before and after a reference flow value which is equal to or greater than a first predetermined value and is closest to the first predetermined value, the determination target flow values being included in flow values stored in the flow memory, and the condition B is such that a difference value derived by subtracting from each of the determination target flow values, an average value found from the each determination target flow value and a predetermined number of measurement flow values measured before the each determination target flow value, is equal to or less than a third predetermined value; wherein the first predetermined value is determined so as to exclude the flow value of the fluid flowing through the fluid passage for a different factor, from the flow values of the fluid flowing through the fluid passage according to a change pattern corresponding to a kind of instrument, at a time point of starting of activation of the gas instrument, the second predetermined value in the condition A is determined based on a maximum value of the flow values of a usage amount of the fuel cell per unit time, and the third predetermined value in the condition B is determined based on a changing magnitude of the flow value of the fluid used in the fuel cell, at each specified time interval.

In accordance with this configuration, the flow meter device is able to identify the change pattern of the flow value of the fluid which increases gradually at a time point of starting of activation of the fuel cell. Thus, the flow meter device has advantages that it can accurately determine whether or not the instrument using the fluid is the fuel cell.

Advantageous Effects of Invention

The present invention has the above described configuration and can achieve advantages that it can accurately determine whether or not the instrument using the fluid is the fuel cell.

BRIEF DESCRIPTION OF THE DRAWINGS

FIG. 1 is a table used to describe findings of the present invention, and showing an example of a correspondence among gas flows (measurement gas flow values) at specified time intervals, difference values each of which is between measurement gas flow values measured at successive time intervals, and measurement codes derived by converting the difference values, at a time point of starting of activation of a fuel cell.

FIG. 2 is a table used to describe findings of the present invention, and showing an example of a correspondence among gas flows at specified time intervals, difference values each of which is between measurement gas flow values measured at successive time intervals, and measurement codes derived by converting the difference values, at a time point of starting of activation of a stove burner.

FIG. 5 is a table showing an example of converted code information stored in a code information preserving section included in the gas meter according to Embodiment 1 of the present invention.

FIG. 6 is a table showing an example of a flow range division table stored in a flow range division table preserving section included in the gas meter according to Embodiment 1 of the present invention.

FIG. 9 is a table showing an example of a correspondence between data utilized in the fuel cell determination process in the gas meter according to Embodiment 1 of the present invention.

FIG. 10 is a table showing an example of a correspondence between data utilized in the fuel cell determination process in the gas meter according to Embodiment 1 of the present invention.

DETAILED DESCRIPTION OF THE PREFERRED EMBODIMENTS

Figure 3:
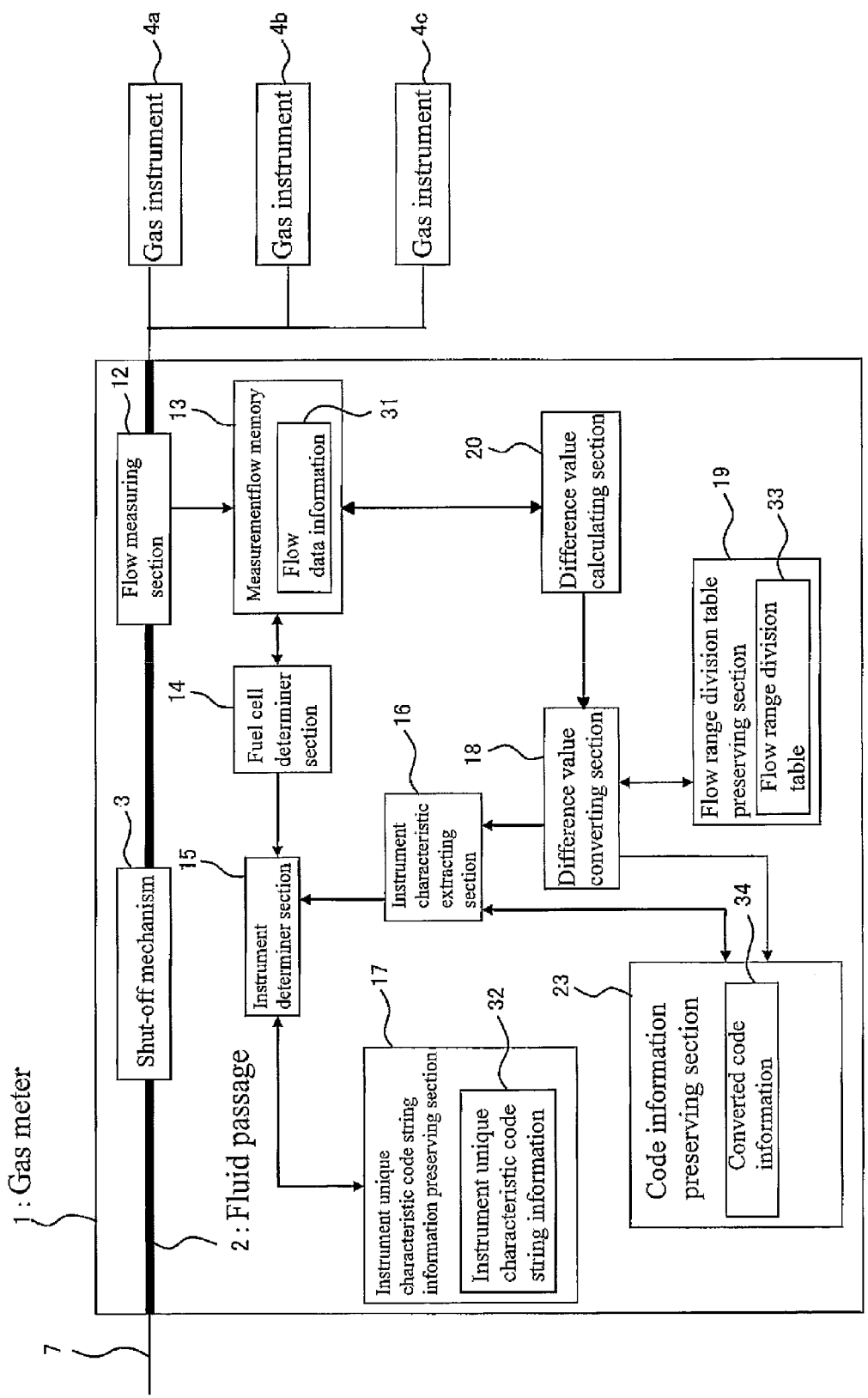
FIG. 3 is a block diagram showing an example of a configuration of major components of a gas meter according to Embodiment 1 of the present invention.

Findings which are Basis of the Present Invention

First of all, prior to describing the gas meter according to the present embodiment, a description will be given of an instrument determination accuracy in a case where a fuel cell is included in gas instruments which possibly use the gas.

Like the gas meter device 200 disclosed in Patent Literature 2, the inventors found difference values each of which is between gas flow values obtained at successive specified time intervals, for each of a case where the gas instrument is a fuel cell and a case where the gas instrument is a stove burner. Then, the inventors made comparison for encoded values (codes) derived by encoding the difference values, between the fuel cell and the stove burner.

More specifically, as shown in FIGS. 1 and 2, for each of the fuel cell and the stove burner, a set of a predetermined number of measurement flow values (flow values) within a predetermined range, are selected as sampled data. Then, regarding the selected set of the measurement flow values, a difference value between each measurement flow value and another measurement flow values which are measured before and after the each measurement flow value is found, and is converted into a measurement code, with reference to, for example, a flow range division table 33 as will be described in Embodiment 1 later.

FIG. 1 is a table used to describe findings of the present invention, and showing an example of a correspondence among gas flows (measurement gas flow values) at specified time intervals, difference values each of which is between measurement gas flow values measured at successive time intervals, and measurement codes derived by converting the difference values, at a time point of starting of activation of the fuel cell. FIG. 2 is a table used to describe findings of the present invention, and showing an example of a correspondence among gas flows at specified time intervals, difference values each of which is between measurement gas flow values measured at successive time intervals, and measurement codes derived by converting the difference values, at a time point of starting of activation of the stove burner.

As shown in FIGS. 1 and 2, the measurement flow value of the fuel cell changes such that it increases a little, whereas the measurement flow value of the stove burner increases and decreases and a changing magnitude between the measurement flow values of the stove burner is greater than a changing magnitude between the measurement flow values of the fuel cell. Thus, between the fuel cell and the stove burner, there is a difference between time-series change patterns of the measurement flow values, but the measurement codes which are results of encoding are the same code string, as can be seen from FIGS. 1 and 2. Specifically, for the fuel cell and the stove burner, the results of encoding are the same code string ([4, 1, 1, 1, . . . ]).

For the above mentioned reason, it was found out that in some cases, it cannot be accurately determined based on the measurement codes whether the gas instrument using the gas is the fuel cell or the stove burner. In addition, it was found out that prior to encoding into the measurement codes, it is necessary to determine whether or not a determination target instrument is the fuel cell, for every individual case.

Based on the above mentioned findings, the present invention provides the following aspects.

According to a first aspect of the present invention, there is provided a flow meter device for measuring a flow value of a fluid used in an instrument, comprising: a flow measuring section for measuring the flow value of the fluid flowing through a fluid passage connected to the instrument at each specified time interval; a flow memory for storing the flow value of the fluid which is measured by the flow measuring section; and a fuel cell determiner unit for determining that the instrument using the fluid is a fuel cell, when a condition A and a condition B are satisfied, in which the condition A is such that a maximum value of determination target flow values is equal to or less than a second predetermined value, the determination target flow values being a predetermined number of flow values measured before and after a reference flow value which is equal to or greater than a first predetermined value and is closest to the first predetermined value, the determination target flow values being included in flow values stored in the flow memory, and the condition B is such that a difference value derived by subtracting from each of the determination target flow values, an average value found from the each determination target flow value and a predetermined number of measurement flow values measured before the each determination target flow value, is equal to or less than a third predetermined value; wherein the first predetermined value is determined so as to exclude the flow value of the fluid flowing through the fluid passage for a different factor, from the flow values of the fluid flowing through the fluid passage according to a change pattern corresponding to a kind of instrument, at a time point of starting of activation of the gas instrument, the second predetermined value in the condition A is determined based on a maximum value of the flow values of a usage amount of the fuel cell per unit time, and the third predetermined value in the condition B is determined based on a changing magnitude of the flow value of the fluid used in the fuel cell, at each specified time interval.

In accordance with the above configuration, the fuel cell determiner unit determines that the instrument using the fluid is a fuel cell, when the determination target flow values satisfy the condition A and the condition B. The determination target flow values are the flow values measured before and after the reference flow value which is equal to or greater than the first predetermined value and is closest to the first predetermined value. That is, the flow values measured before and after the reference flow value are used to determine whether or not the instrument using the fluid is the fuel cell.

The first predetermined value is determined so as to exclude the flow value of the fluid flowing through the fluid passage for a different factor, from the flow values of the fluid flowing through the fluid passage according to the change pattern corresponding to the kind of the instrument, at a time point of starting of activation of the instrument. This makes it possible to determine whether or not the instrument using the fluid is the fuel cell, using the measurement flow values except for the factor which impedes the change pattern of the flow values corresponding to the kind of instrument. The fluid flowing through the fluid passage for a different factor, is for example, a fluid flowing to pilot flame, in the case where the fluid is the gas.

The second predetermined value is determined based on the maximum value of the flow values of the usage amount of the fuel cell per unit time. Therefore, using the condition A, it becomes possible to exclude the instrument in which the flow of the fluid used per unit time is greater than that of the fuel cell.

The third predetermined value is determined based on the changing magnitude of the flow of the fluid used in the fuel cell, at each specified time interval. Therefore, using the condition B, it becomes possible to exclude the instrument in which the changing magnitude of the measured flow is greater than that of the fuel cell.

That is, the conditions A and B make it possible to identify the change pattern of the flow value of the fluid which increases gradually at a time point of starting of activation of the fuel cell. Thus, the flow meter device can achieve advantages that it can be accurately determined whether or not the instrument using the fluid is the fuel cell.

According to a second aspect of the present invention, in the flow meter device, the fuel cell determiner unit determines that the instrument using the fluid is a fuel cell, when a condition C in addition to the condition A and the condition B are satisfied, the condition C being such that a sum of the difference values found using the condition B is equal to or less than a fourth predetermined value, and the fourth predetermined value is determined based on the changing magnitude of the flow value of the fluid used in the fuel cell, during a period in which the determination target flow values are measured.

In accordance with the above configuration, the fuel cell determiner unit determines that the instrument using the fluid is the fuel cell, when the determination target flow values satisfy the condition C in addition to the condition A and the condition B.

The fourth predetermined value is determined based on the changing magnitude of the flow value of the fluid used in the fuel cell, during a period in which the determination target flow values are measured. Therefore, using the condition C, it becomes possible to exclude the instrument in which the changing magnitude of the flow in the measurement period of the determination target flow values is greater than that of the fuel cell. In other words, it becomes possible to exclude the instrument in which the changing magnitude between the respective flows measured is small but the changing magnitude of the flow of the fluid is great in the whole measurement period of the determination target flow values. By adding the condition C to the conditions A and B, it becomes possible to more accurately identify the change pattern unique to the fuel cell in which the flow of the used fluid increases gradually.

According to a third aspect of the present invention, the flow meter device further comprises an instrument unique information memory for storing instrument unique information which is information indicating a change pattern corresponding to a kind of the instrument, of the flow value of the fluid used at a time point of starting of activation of the instrument; a change pattern information generating unit for generating change pattern information indicating the change pattern of the flow values stored in the flow memory, when the fuel cell determiner unit determines that the instrument using the fluid is not the fuel cell; and an instrument determiner unit for determining the kind of the instrument using the fluid by comparing the instrument unique information stored in the instrument unique information memory, to the change pattern information generated by the change pattern information generating unit.

In accordance with the above configuration, the flow meter device includes the change pattern information generating unit and the instrument determiner unit. This makes it possible to determine the kind of the instrument using the fluid, by comparing the change pattern indicated by the measurement flow value to the instrument unique information stored in the instrument unique information memory, when it is determined that the instrument using the fluid is not the fuel cell.

That is, it is determined firstly whether or not the instrument using the fluid is the fuel cell, and then the kind of the instrument is determined using the instrument unique information, only when it is determined that the instrument is not the fuel cell. Since the kind of the instrument can be determined in a state in which the fuel cell is excluded from candidates in advance, the kind of the instrument can be determined efficiently.

According to a fourth aspect of the present invention, there is provided a method of controlling a flow meter device for measuring a flow value of a fluid used in an instrument, the flow meter device including a flow memory for storing the measured flow value, the method comprising: a first step of measuring the flow value of the fluid flowing through a fluid passage connected to the instrument at each specified time interval; and a second step of storing the flow value measured in the first step, in the flow memory; and determining that the instrument using the fluid is a fuel cell, when a condition A and a condition B are satisfied, in which the condition A is such that a maximum value of determination target flow values is equal to or less than a second predetermined value, the determination target flow values being a predetermined number of flow values measured before and after a reference flow value which is equal to or greater than a first predetermined value and is closest to the first predetermined value, the determination target flow values being included in the flow values stored in the flow memory in the second step, and the condition B is such that a difference value derived by subtracting from each of the determination target flow values, an average value found from the each determination target flow value and a predetermined number of measurement flow values measured before the each determination target flow value, is equal to or less than a third predetermined value; the first determined value is determined so as to exclude the flow value measured during a period in which the fluid flows through a fluid passage for a factor other than the fluid supplied according to a change pattern of the flow value corresponding to a kind of the instrument at a time point of starting of activation of the instrument, the second predetermined value in the condition A is determined based on a maximum value of the flow values of a usage amount of the fuel cell per unit time, and the third predetermined value in the condition B is determined based on a changing magnitude of the flow value of the fluid used in the fuel cell, at each specified time interval.

In accordance with the above method, the conditions A and B make it possible to identify the change pattern of the flow value of the fluid which increases gradually, at a time point of starting of activation of the fuel cell. Thus, the flow meter device can achieve advantages that it can be accurately determined whether or not the instrument using the fluid is the fuel cell.

Hereinafter, embodiments will be described in detail as aspect for practicing the present invention, with reference to the drawings. The embodiments are in no way intended to limit the present invention. In description of the embodiments, the same or corresponding components are designated by the same reference symbols and will not be described in repetition.

Embodiment 1

A gas meter (flow meter device) 1 according to Embodiment 1 will be described with reference to FIG. 3. FIG. 3 is a block diagram showing an example of a configuration of major components of a gas meter 1 according to Embodiment 1 of the present invention. FIG. 3 particularly shows a configuration of major components associated with an instrument determination process executed by the gas meter 1.

As shown in FIG. 3, the gas meter 1 includes a fluid passage 2, a flow measuring section 12, a measurement flow memory (flow memory) 13, a fuel cell determiner section (fuel cell determiner unit) 14, an instrument determiner section (instrument determiner unit) 15, an instrument characteristic extracting section (change pattern information generating unit) 16, an instrument unique characteristic code string information preserving section (device unique information memory) 17, a difference value converting section (change pattern information generating unit) 18, a flow range division table preserving section 19, a difference value calculating section (change pattern information generating unit) 20, and a code information preserving section 23. Further, the gas meter 1 includes a shut-off mechanism 3 disposed in the fluid passage 2, to shut-off a gas flowing through the fluid passage 2, in emergencies, etc.

The gas meter 1 is connected to a gas pipe 7 at an upstream side of the fluid passage 2, and connected to various gas instruments (devices) 4a to 4c, such as a gas table, a fan heater, a floor heating, a fuel cell, etc., at a downstream side of the fluid passage 2. In a case where it is not particularly necessary to distinguish the gas instruments 4a to 4c from each other, they will be collectively referred to as the gas instrument 4. Although three gas instruments 4 are connected to the downstream side of the fluid passage 2 in the example of FIG. 3, the present invention is not limited to this, and the gas instruments 4 of a desired number may be provided.

The flow measuring section 12 emits an ultrasonic wave to a fluid (gas) flowing through the fluid passage 2 at specified time intervals to measure a flow (flow rate) of the fluid. For example, as the flow measuring section 12, a general device such as an ultrasonic flow meter may be used. That is, the flow measuring section 12 is configured such that ultrasonic sensors are attached on the flow fluid passage 2 at an upstream location and a downstream location, respectively, to measure a flow velocity of the gas flowing through the fluid passage 2 based on a difference between times when the ultrasonic wave reaches and measure a gas flow from the flow velocity of the gas. Then, the flow measuring section 12 transmits a measurement flow value which is a gas flow value obtained by the measurement, to the measurement flow memory 13.

The measurement flow memory 13 is configured to store flow data information 31 which is table information in which the measurement flow values transmitted from the flow measuring section 12 respectively correspond with measurement times (order of measurement) when the gas flow velocities are measured to obtain the measurement flow values. For example, the flow data information 31 includes the table information such that when an arbitrary measurement flow value is indicated by $Q(n)$ (n is a natural value which is equal to or greater than 1), the measurement flow values $Q(1), Q(2), Q(3), \ldots Q(22)$ correspond with the order (n=1, 2, 3 \ldots 22) in which these 22 measurement flow values are obtained.

Figure 4:
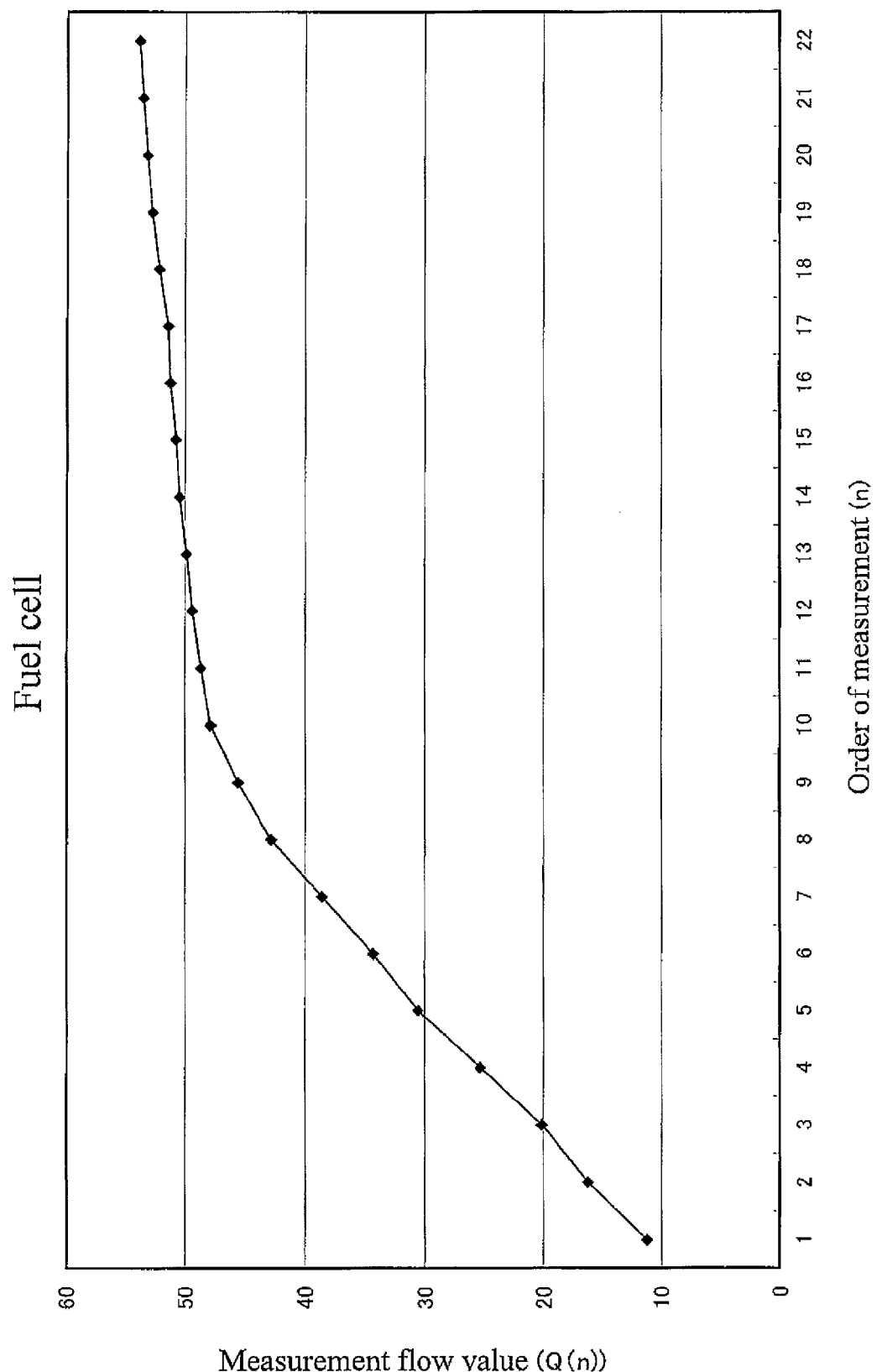
FIG. 4 is a graph showing an example of a time-series change in measurement flow values of the fuel cell, which is obtained in the gas meter according to Embodiment 1 of the present invention.

The fuel cell determiner section 14 determines whether or not the gas instrument 4 using the gas is the fuel cell, with reference to the flow data information 31 stored in the measurement flow memory 13. In a case where the gas instrument 4 using the gas is the fuel cell, a change in a gas usage amount, i.e., a change in the flow of the gas flowing through the fluid passage 2 has a characteristic in which the gas flow increases gradually as shown in FIG. 4. FIG. 4 is a graph showing an example of a time-series change in measurement flow value $Q(n)$ of the fuel cell, which is obtained in the gas meter 1 according to Embodiment 1 of the present invention. In FIG. 4, a vertical axis indicates the measurement flow value $Q(n)$ and a horizontal axis indicates the order (n) in which the measurement flow value is measured. For example, if the measurement of the measurement flow value is performed at time intervals of 0.5 second, n=1, 2, 3, 4 \ldots, indicate times that pass, which are 0.5 second, 1.0 second, 1.5 seconds, 2 seconds, \ldots, respectively.

In the gas meter 1 of Embodiment 1, the fuel cell determiner section 14 sets a specified flow measurement interval estimated to include the above stated characteristic curve in which the measurement flow value gradually increases, to determine whether or not this characteristic curve exists. Then, in the set flow measurement interval, the fuel cell determiner section 14 extracts the gas measurement flow values $Q(n)$ at measurement times (the order n in which the measurement flow values are obtained), as fuel cell determination target flow values (hereinafter will be referred to as determination target flow values). Then, the fuel cell determiner section 14 determines whether or not the gas instrument 4 using the gas is the fuel cell, depending on whether or not each of the extracted determination target flow values satisfies the following two conditions A and B.

Condition A: A maximum value of the determination target flow values is equal to or less than a second predetermined value (e.g., 55 L/h). The second predetermined value is determined based on the maximum value of the flow values of a usage amount of the fuel cell per unit time.

Condition B: A difference value derived by subtracting from each of all of the determination target flow values, an average value (e.g., secondary moving average) found from the each determination target flow value and a predetermined number of measurement flow values measured before the each determination target flow value, is equal to or less than a third predetermined value (e.g., 5 L/h). The third predetermined value is determined based on a changing magnitude of the flow value of the fluid used in the fuel cell, at the above each specified time interval.

When the fuel cell determiner section 14 determines that the above mentioned two conditions A and B are satisfied, it determines that the gas instrument 4 using the gas is the fuel cell. On the other hand, when the fuel cell determiner section 14 determines that either one of the above mentioned two conditions A and B is not satisfied, it determines that the gas instrument 4 using the gas is the instrument other than the fuel cell. Then, the fuel cell determiner section 14 notifies the instrument determiner section 15 of this result of the determination.

The difference value calculating section 20 calculates a difference value between an arbitrary measurement flow value $Q(n)$ and the measurement flow value measured before the arbitrary measurement flow value $Q(n)$, with reference to the flow data information 31 stored in the measurement flow memory 13. More specifically, the difference value calculating section 20 calculates the difference value ($\Delta Q(n)$) between the arbitrary measurement flow value $Q(n)$ and the measurement flow value $Q(n-1)$ measured at a timing which is one time interval before a timing corresponding to the arbitrary measurement flow value $Q(n)$.

When the difference value calculating section 20 calculates the difference value ($\Delta Q(n)$), it outputs this difference value to the difference value converting section 18.

The difference value converting section 18 converts the difference value $\Delta Q(n)$ calculated by the difference value calculating section 20, with reference to the flow range division table 33 stored in the flow range division table preserving section 19, to generate the measurement code string. The measurement code string represents in a pseud manner the actually obtained change pattern of the measurement flow values, by using the codes.

The difference value converting section 18 causes the code information preserving section 23 to store the created measurement code string as the converted code information 34 which is table information in which the created measurement code string corresponds with the measurement flow values $Q(n)$, and the difference values $\Delta Q(n)$. The converted code information 34 stored in the code information preserving section 23 is, for example, table information illustrated in FIG. 5. That is, the converted code information 34 is table information in which the difference value $\Delta Q(n)$ and the measurement code corresponding to each of the measurement flow values $Q(n)$ correspond with the flow data information 31 which is the time-series data of the measurement flow value $Q(n)$. FIG. 5 is a table showing an example of the converted code information 34 stored in the code information preserving section 23 included in the gas meter 1 according to Embodiment 1 of the present invention.

For example, as shown in FIG. 6, the flow range division table 33 preserved in the flow range division table preserving section 19 is table information indicating a correspondence between a range in which an absolute value of the difference value ΔQ(n) may lie and the code corresponding to this range. As shown in FIG. 6, the range in which an absolute value of the difference value ΔQ(n) may lie is divided into plural ranges, and measurement codes of 0 to F are allocated to these divided ranges, respectively. FIG. 6 is a table showing an example of the flow range division table 33 stored in the flow range division table preserving section 19 included in the gas meter 1 according to Embodiment 1 of the present invention.

The instrument characteristic extracting section 16 generates an extracted code string from the measurement code strings created by the difference value converting section 18. The instrument characteristic extracting section 16 outputs the generated extracted code string to the instrument determiner section 15. The extracted code string is a code string composed of plural measurement codes extracted from the measurement code strings based on a predetermined condition (condition α as will be described later), and is change pattern information derived by encoding a change characteristic in the change pattern corresponding to each kind of the gas instrument 4. This extracted code string will be described in detail later.

The instrument determiner section 15 determines the kind of the gas instrument 4 using the gas (gas instrument other than the fuel cell), with reference to the extracted code string created by the instrument characteristic extracting section 16.

Specifically, when the instrument determiner section 15 receives the information indicating that the gas instrument 4 using the gas is the fuel cell, from the fuel cell determiner section 14, it determines that the gas instrument 4 using the gas is the fuel cell, based on the received information. On the other hand, when the instrument determiner section 15 receives the information indicating that the gas instrument 4 using the gas is not the fuel cell, from fuel cell determiner section 14, it instructs the difference value calculating section 20, the difference value converting section 18, and the instrument characteristic extracting section 16, to generate the extracted code string. Then, the instrument determiner section 15 receives the generated extracted code string from the instrument characteristic extracting section 16, and determines the kind of the gas instrument 4 using the gas based on this extracted code string.

More specifically, the instrument determiner section 15 compares the received extracted code string to instrument unique characteristic code string information (device unique information) 32 pre-stored in the instrument unique characteristic code string information preserving section 17, for each of the gas instruments 4a to 4c, and determines the gas instrument 4 using the gas, based on its analogous relationship, etc. The instrument unique characteristic code string information 32 is defined as information in which the code string indicating a typical change pattern of the flow of the gas used in each of the gas instruments 4a to 4c, is stored for each kind of the gas instruments 4a to 4c. The detail of the instrument unique characteristic code string information 32 will be described later.

(Instrument Determination Process)

Figure 7:
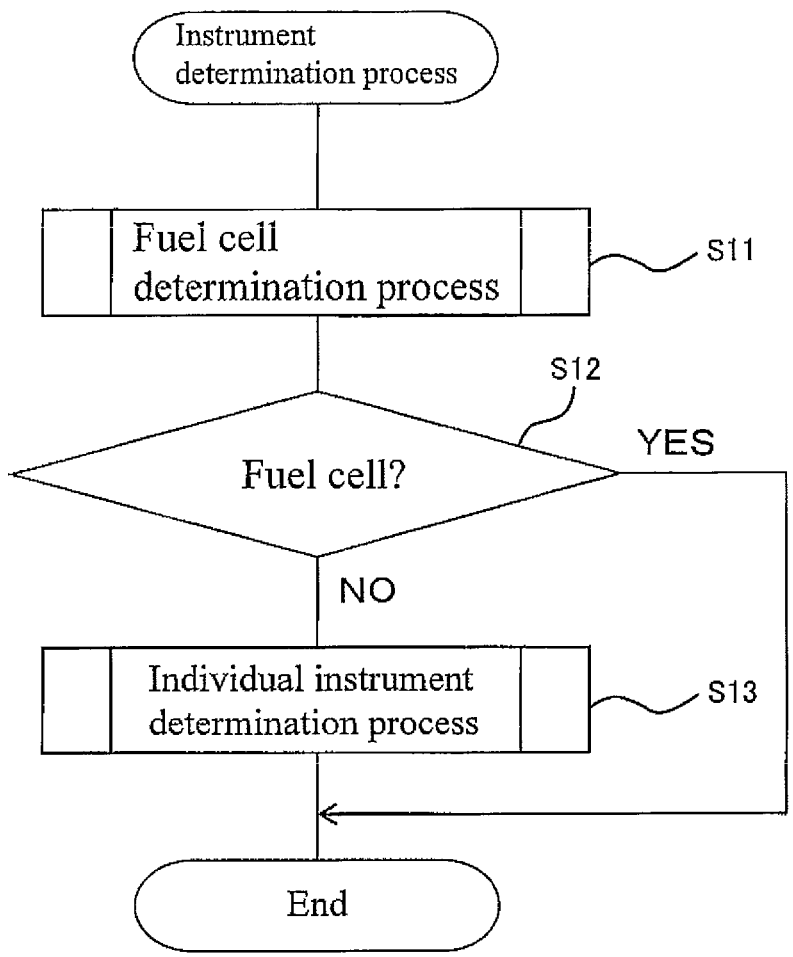
FIG. 7 is a flowchart showing an example of an instrument determination process executed by the gas meter according to Embodiment 1 of the present invention.

In the gas meter 1 having the above configuration, the instrument determination process for determining the gas instrument 4 using the gas, from among the gas instruments 4a to 4c (e.g., gas table, fan heater, floor heating, fuel cell, etc.), connected to the downstream side of the fluid passage 2, is executed as follows. The instrument determination process will be described with reference to FIG. 7. FIG. 7 is a flowchart showing an example of the instrument determination process executed by the gas meter 1 according to Embodiment 1 of the present invention.

Initially, in the gas meter 1, the fuel cell determiner section 14 executes a fuel cell determination process for determining whether or not the gas instrument 4 using the gas is the fuel cell (step S11). In the fuel cell determination process, when the fuel cell determiner section 14 determines that the gas instrument 4 which is a determination target is the fuel cell, the instrument determiner section 15 determines that the gas instrument 4 using the gas is the fuel cell ("YES" in step S12), and terminates the instrument determination process.

On the other hand, in the fuel cell determination process, when the fuel cell determiner section 14 determines that the gas instrument 4 which is a determination target is not the fuel cell, the instrument determiner section 15 determines that the gas instrument 4 using the gas is not the fuel cell ("NO" in step S12), and executes individual instrument determination process (step S13). Then, when the instrument determiner section 15 identifies the kind of the gas instrument 4 using the gas in the individual instrument determination process, it terminates the instrument determination process.

(Fuel Cell Determination Process)

Figure 8:
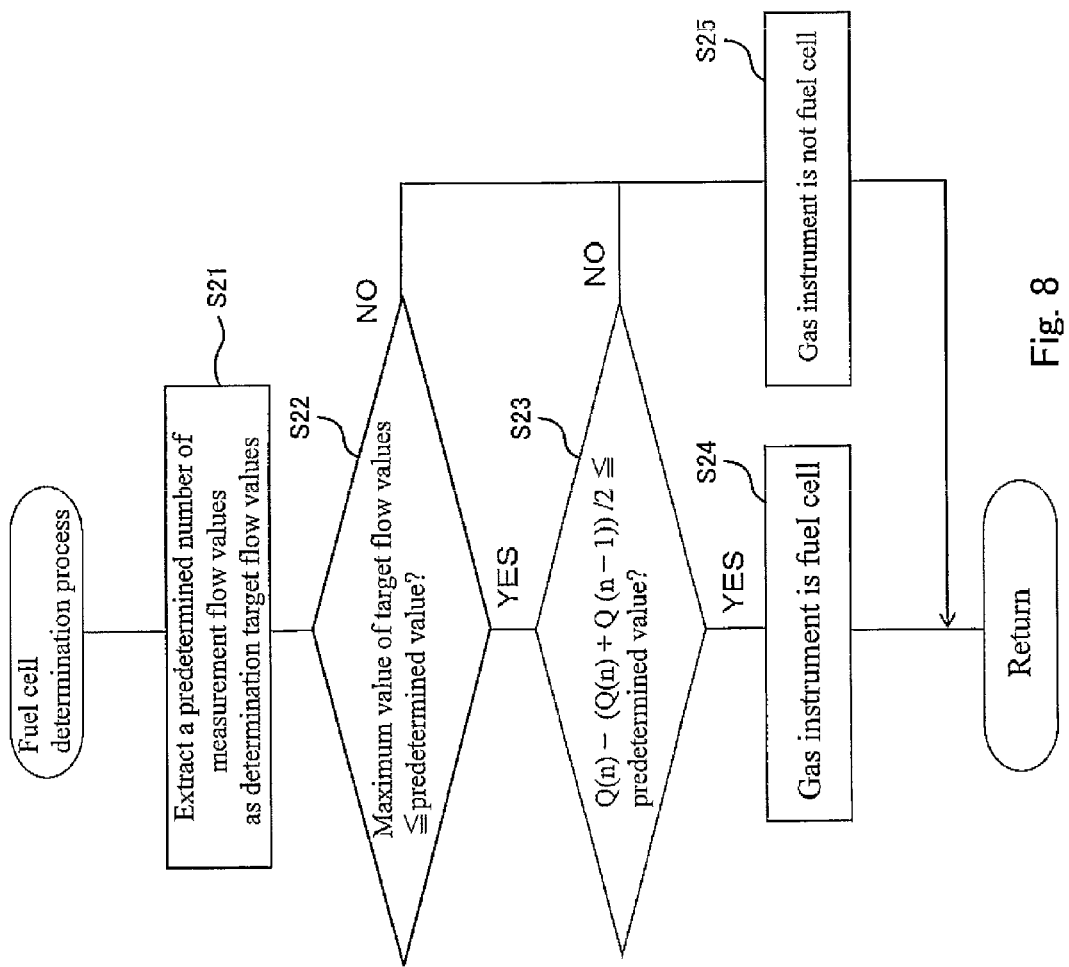
FIG. 8 is a flowchart showing an example of a fuel cell determination process executed by the gas meter according to Embodiment 1 of the present invention.

Next, the fuel cell determination process will be described with reference to FIG. 8. FIG. 8 is a flowchart showing an example of the fuel cell determination process executed by the gas meter 1 according to Embodiment 1 of the present invention.

Initially, the flow measuring section 12 measures the measurement flow value (absolute flow value) of the gas flowing through the fluid passage 2 at specified time intervals (e.g., intervals of 0.5 second), and stores the measurement flow value as the flow data information 31 in the measurement flow memory 13. In Embodiment 1, for example, 22 measurement flow values are stored as the flow data information 31.

The fuel cell determiner section 14 extracts as determination target flows a predetermined number (e.g., 19) of measurement flow values satisfying a predetermined condition, from among the flow data information 31 (step S21).

That is, the predetermined condition is the predetermined number of measurement flow values which are obtained before and after a reference measurement flow value which is equal to or greater than a first predetermined value and is closest to the first predetermined value, from among the measurement flow values stored in the measurement flow memory 13. The measurement flow values satisfying the predetermined condition are recognized as determination target flow values.

In Embodiment 1, the first predetermined value in the predetermined condition is equal to or greater than 36 L/h. Using as a reference the measurement flow value which is equal to or greater than the first predetermined value and is closest to the first predetermined value (measurement flow value which firstly exceeds the first predetermined value), 14 measurement flow values sequentially measured after the reference measurement flow value, and 4 measurement flow values measured before the reference measurement flow value, are extracted as the determination target flow values. That is, 19 measurement flow values in total, including 4 measurement flow values measured before the reference measurement flow value and 14 measurement flow values measured after the reference measurement flow value, are the determination target flow values.

For example, assuming that the measurement flow values of n=1 to 22 of FIG. 9 are stored in the flow data information 31 as the measurement flow values, the reference measurement flow value, which is equal to or greater than the first predetermined value (36 L/h) and is closest to the first predetermined value, is a 7th measurement flow value (measurement flow value Q(7)=38.611 L/h). 14 measurement flow values sequentially measured after this reference measurement flow value are 8th to 21st measurement flow values (Q(8)=42.812 L/h to Q(21)=53.583 L/h).

4 measurement flow values measured before the reference measurement flow value, are 3rd to 6th measurement flow values (Q(3)=20.115 L/h to Q(6)=34.369 L/h).

FIG. 9 is a table showing an example of a correspondence between data utilized in the fuel cell determination process in the gas meter 1 according to Embodiment 1 of the present invention. In FIG. 9, there is illustrated a correspondence among a measurement flow value during use of the fuel cell, a difference value between this measurement flow value and a measurement flow value obtained before this measurement flow value, a measurement code generated by encoding this difference value, an average value (moving average) between this measurement flow value and the measurement flow value obtained before this measurement flow value, and a difference value derived by subtracting this measurement flow value from the moving average.

Now, a description will be given of the reason why the first predetermined value is set equal to or greater than 36 L/h.

The gas instrument 4 has a characteristic in a change pattern of the gas flow changing according to use, especially the gas flow from a time point of starting of activation of the gas instrument 4, for each kind of the gas instrument 4. In the present embodiment, there is a precondition in which the gas instrument 4 using the gas is determined in view of this characteristic.

However, in an initial stage at a time point of starting of activation of the gas instrument 4, there is, for example, a gas as follows, flowing through the fluid passage 2 irrespective of the change pattern of the gas flow unique to this gas instrument 4. That is, there exists a gas of a specified flow (about 10 L/h) flowing at the time of opening of the gas instrument 4, or a gas (gas used for pilot flame) of a specified flow (about 21 L/h) consumed to ignite the gas instrument 4. In a state in which there exist flows of these gases, the kind of the gas instrument 4 using the gas cannot be accurately determined.

To eliminate an influence of the flow of the fluid flowing irrespective of the above mentioned change pattern of the gas flow unique to the gas instrument 4, in other words, to exclude the flow value of the fluid flowing through this fluid passage for a different factor, from the flow value of the fluid flowing through the fluid passage according to the change pattern corresponding to the kind of the gas instrument 4, at a time point of starting of activation of the gas instrument 4, the threshold of 36 L/h is set.

It should be noted that the first predetermined value is set to have an allowance with respect to the flow value (about 21 L/h) used in the pilot flame.

Also, to confirm a change in the measurement flow value before and after the first predetermined value (in the present embodiment, 36 L/h), in the gas meter 1 of Embodiment 1, 4 measurement flow values before the reference measurement flow value (Q(7)) are also used as the fuel cell determination target flow values.

After the determination target flow values are extracted in the above described manner, the fuel cell determiner section 14 determines whether or not each of all of the determination target flow values satisfies the conditions A and B.

As described previously, the condition A is such that the maximum value of the determination target flow values is equal to or less than the second predetermined value (e.g., 55 L/h).

The fuel cell determiner section 14 determines whether or not the maximum value of the determination target flow values is equal to or less than 55 L/h (step S22). In the example of FIG. 9, the maximum value of the determination target flow values is 53.583 L/h corresponding to Q(21) and falls within a range of 55 L/h. Therefore, the condition A is satisfied. When the fuel cell determiner section 14 determines that the condition A is satisfied ("YES" in step S22), it further determines whether or not the maximum value of the determination target flow values satisfies the condition B.

As described before, the condition B is such that the difference value derived by subtracting from an arbitrary (n-th) determination target flow value Q(n), among all of the determination target flow values, an average value (e.g., secondary moving average) found from this arbitrary determination target flow value Q(n) and a predetermined number of measurement flow values measured before this arbitrary determination target flow value Q(n), is equal to or less than the third predetermined value (e.g., 5 L/h).

In Embodiment 1, the measurement flow value measured before a timing which is one time interval before a timing corresponding to the determination target flow value Q(n) is the measurement flow value Q(n−1). The fuel cell determiner section 14 determines whether not Q(n)−(Q(n)+Q(n−1))/2≤predetermined value (5 L/h) (step S23).

For example, in the example of FIG. 9, the 3rd measurement flow value Q(3) which is oldest data among the determination target flow values is a starting point. Then, an average value of Q(3) (=20.115 L) and Q(2) (=16.226 L) which is measured at a timing which is one time interval before a timing corresponding to the determination target flow value Q(3), is calculated ((20.115+16.226)/2≈18.171). In the same manner, from the starting point of Q(3), an average value of each of Q(4), Q(5), . . . and the corresponding value measured at a timing which is one time interval before a timing corresponding to Q(4), Q(5), . . . , is calculated. In this way, for all of the determination target flow values, the moving averages Q(n)' are calculated. In the example of FIG. 9, the moving averages Q(3)' to Q(21)' are 18.171, 22, 715, 27.949, . . . 53.402.

A difference value derived by subtracting the moving average Q(3)' corresponding to the measurement flow value Q(3) as the starting point, from this measurement flow value Q(3), is 1.945. When calculation is executed in the same manner sequentially for cases where starting points are Q(4) to Q(21), results are 2.600, 2.635, . . . 0.181 as shown in FIG. 9. The fuel cell determiner section 14 calculates these values (Q(n)−Q(n)') for cases from the determination target flow value Q(3) to the determination target flow value Q(21), and determines whether or not each of these values (Q(n)−Q(n)') is equal to or less than the third predetermined value (e.g., 5 L/h). In the example of FIG. 9, the values (Q(n)−Q(n)') corresponding to the determination target flow values (n=3 to 21) are all equal to or less than (5 L/h). Therefore, the condition B is satisfied ("YES" in step S23).

Although regarding the condition B, the moving average Q(n)' of the arbitrary measurement flow value Q(n) as the starting point and the measurement flow value Q(n−1) measured at a timing which is one time interval before a timing corresponding to the measurement target flow value Q(n), is subtracted from the measurement flow value Q(n), this calculation is merely exemplary. For example, the moving average Q(n)' of plural measurement flow values measured at timings which are plural time intervals before a timing corresponding to the arbitrary measurement flow value Q(n), is calculated. Then, this moving average Q(n)' may be subtracted from Q(n).

When both of the condition A and the condition B are thus satisfied, the fuel cell determiner section 14 determines that the gas instrument 4 using the gas is the fuel cell (step S24). On the other hand, if either one of the condition A and the condition B is not satisfied, the fuel cell determiner section 14 determines that the gas instrument 4 using the gas is not the fuel cell (step S25).

When the fuel cell determiner section 14 determines that the gas instrument 4 using the gas is not the fuel cell in the present case (step S25), it notifies the instrument determiner section 15 of this information. In response to this information, the instrument determiner section 15 performs the individual instrument determination process as described above.

For example, in a case where data of FIG. 10 is obtained, the fuel cell determiner section 14 determines that the gas instrument 4 using the gas is not the fuel cell. FIG. 10 is a table showing an example of a correspondence among data utilized in the fuel cell determination process in the gas meter 1 according to Embodiment 1 of the present invention. FIG. 10 shows a table showing the correspondence among the data utilized in the fuel cell determination process, using the measurement flow values obtained during use of the stove burner. With reference to the table of FIG. 10, in the case of Q(7), a difference value between Q(7) and the moving average Q(7)' is 19.641 (L/h), which does not satisfy the condition B. Therefore, in the case where the measurement flow values of FIG. 10 are obtained, the fuel cell determiner section 14 determines that the gas instrument 4 using the gas is not the fuel cell.

55 L/h which is the second predetermined value set in the condition A and 5 L/h which is the third predetermined value set in the condition B are values set suitably by observing gas usage amount during actual activation of the fuel cell.

That is, during activation of the fuel cell, the flow of the gas being used, i.e., the flow of the gas flowing through the fluid passage 2, does not exceed, for example, 55 L/h. Therefore, by setting the predetermined value to 55 L/h, it becomes possible to distinguish the fuel cell from another gas instrument 4 in which gas usage amount at each measurement time interval exceeds 55 L/h, using the condition A.

Even when the gas usage amount during the measurement time period does not exceed 55 L/h, i.e., the condition A is satisfied, the gas instrument 4 using the gas is not the fuel cell, like the stove burner of FIG. 10, which happens in some cases. So, the moving average Q(n)' of Q(n) and Q(n−1) is calculated, and a difference value between Q(n) and Q(n') is calculated by subtracting Q(n)' from Q(n). Then, it is confirmed whether or not a measurement gas flow value changes rapidly from Q(n−1) to Q(n). That is, as shown in FIG. 4 as mentioned above, the fuel cell has characteristics in which the change pattern of the gas flow from starting of activation is very gradual. In other words, the fuel cell has a characteristic in which a changing magnitude of the gas flow at each measurement time is very small. By further setting the condition B to reflect this characteristic, it can be determined more accurately whether or not the gas instrument 4 which is a determination target is the fuel cell.

(Individual Instrument Determination Process)

Figure 15:
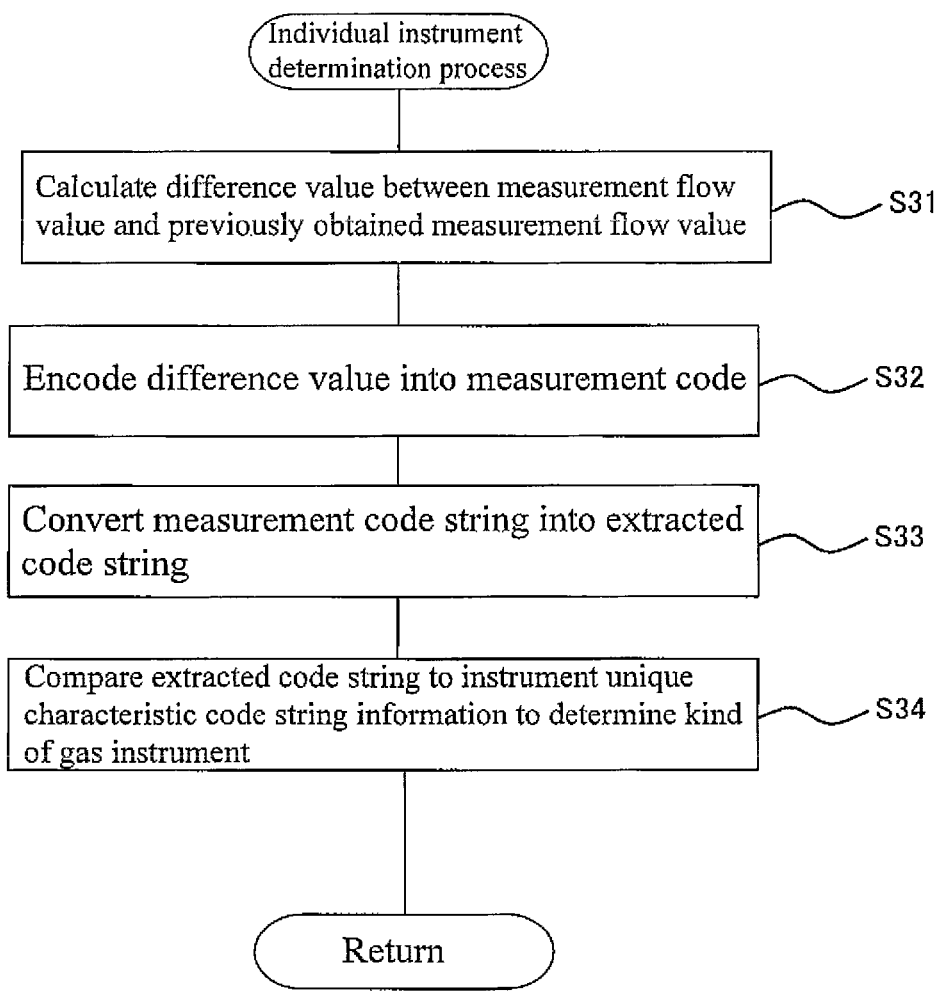
FIG. 15 is a flowchart showing an example of an individual instrument determination process executed by the gas meter according to Embodiment 1 of the present invention.

Next, a description will be given of the individual instrument determination process executed in the case where the fuel cell determiner section 14 determines that the gas instrument 4 using the gas is not the fuel cell, in the gas meter 1 of the present embodiment, with reference to FIG. 15. FIG. 15 is a flowchart showing an example of the individual instrument determination process executed by the gas meter 1 according to Embodiment 1 of the present invention.

When the fuel cell determiner section 14 determines that the gas instrument 4 using the gas is not the fuel cell, the instrument determiner section 15 instructs the difference value calculating section 20, the difference value converting section 18, and the instrument characteristic extracting section 16, to generate the extracted code string.

Initially, in accordance with the instruction from the instrument determiner section 15, the difference value calculating section 20 calculates a difference value between an arbitrary measurement flow value and a measurement flow value obtained before this measurement flow value (step S31).

More specifically, with reference to the flow data information 31 stored in the measurement flow memory 13, the difference value calculating section 20 calculates the difference value $\Delta Q(n)$ ($\Delta Q(n)=Q(n)-Q(n-1)$) between the arbitrary measurement flow value (absolute flow value) Q(n) and the measurement flow value Q(n−1) measured before the arbitrary measurement flow value Q(n).

Although $\Delta Q(n)$ is the difference value between the arbitrary measurement flow value and the measurement flow value measured before the arbitrary measurement flow value, the present invention is not limited to this. For example, the difference value $\Delta Q(n)$ may be a difference value between the arbitrary measurement flow value and a measurement flow value measured at a timing which is plural time intervals before a timing corresponding to the arbitrary measurement flow value.

After the difference value calculating section 20 calculates the difference value $\Delta Q(n)$, it outputs the difference value $\Delta Q(n)$ to this difference value converting section 18.

The difference value converting section 18 encodes the difference value calculated by the difference value calculating section 20 into the measurement code with reference to the flow range division table 33 (step S32).

The difference value converting section 18 finds the absolute value of the difference value $\Delta Q(n)$ calculated by the difference value calculating section 20. With reference to the flow range division table 33 of FIG. 6, the difference value converting section 18 converts the absolute value of the difference value $\Delta Q(n)$ into the measurement code. Then, the difference value converting section 18 stores in the code information preserving section 23 the converted code information 34 which is table information indicating a correspondence among the measurement flow value Q(n) measured at each specified time interval, the difference value $\Delta Q(n)$ which is between this Q(n) and, for example, the measurement flow value Q(n−1) measured at a timing which is one time interval before a timing corresponding to this Q(n), and a measurement code created by encoding the absolute value of the difference value $\Delta Q(n)$. The converted code information 34 is, for example, table information as shown FIG. 5.

Figure 11:
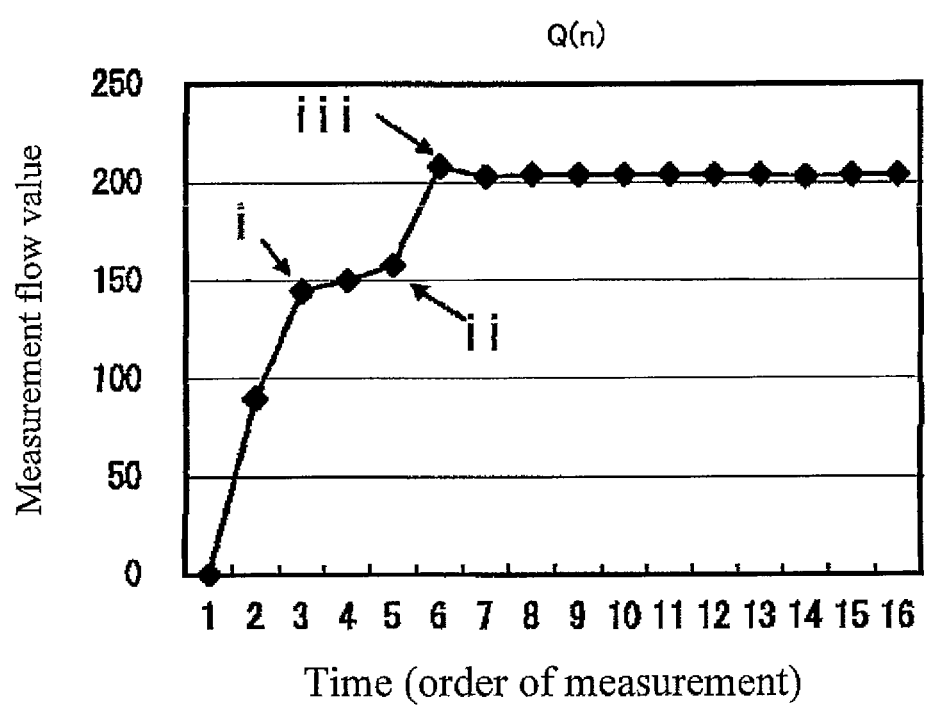
FIG. 11 is a graph showing an example of a time-series change in measurement flow values measured by the gas meter according to Embodiment 1 of the present invention.

More specifically, for example, when a gas instrument A (e.g., gas fan heater) corresponding to any one of the gas instruments 4a to 4c is activated, the gas is supplied to the gas instrument A through the fluid passage 2. It is supposed that at this time the measurement flow value of the gas flowing through the fluid passage 2 changes as indicated by the table of FIG. 5. A change pattern of this gas flow is shown in the graph of FIG. 11. FIG. 11 is a graph showing an example of a time-series change in the measurement flow value obtained in the gas meter 1, according to Embodiment 1 of the present invention.

As shown in the graph of FIG. 11, the measurement flow value changes from the measurement flow value Q(1)=0 L/h to the measurement flow value Q(2)=90 L/h, and thereafter changes with a passage of time.

As described above, the flow measuring section 12 measures the measurement flow value at each specified time interval, and stores the measurement flow value as the flow data information 31 in the measurement flow memory 13. With reference to the flow data information 31, the difference value calculating section 20 calculates the difference value ΔQ(n). Then, the difference value converting section 18 converts the difference value ΔQ(n) into the measurement code. In the example of the table of FIG. 5, the difference value converting section 18 converts the difference value ΔQ(1)=0, ΔQ(2)=90, ΔQ(3)=55 . . . , corresponding to n=1, 2, 3 . . . , into the code string 0, 7, 6, . . . . In addition, the difference value converting section 18 adds to the converted code information 34 the measurement code string obtained by converting the absolute values of the difference values ΔQ(n) into the measurement codes, and thus updates the converted code information 34. When the difference value converting section 18 completes converting of the difference value ΔQ(n) into the measurement code, it notifies the instrument characteristic extracting section 16 of this information.

After the difference value converting section 18 generates the measurement code string and updates the converted code information 34, the instrument characteristic extracting section 16 further converts the measurement code string into the extracted code string (step S33).

The change pattern of the gas flow in the fluid passage 2 has a characteristic unique to the gas instrument 4 depending on the kind of the gas instrument 4, in a period before the gas flow reaches a stabilized state from starting of the use of the gas. For example, a certain gas instrument 4 indicates a change pattern of the gas flow in which a gas usage amount is greater for a specified time after starting of the use of the gas, and thereafter reaches a stabilized state in which the gas usage amount is constant. Or, a certain gas instrument 4 indicates a change pattern of the gas flow in which the gas usage amount is greater for a specified time after starting of the use of the gas, then reaches a stabilized state for a certain period in which the gas usage amount is constant, then changes greatly again, and thereafter reaches a stabilized state in which the gas usage amount is constant. The extracted code is the code string indicating the characteristic of the change pattern of the gas flow for a period before the gas flow reaches the stabilized state, during rising at starting of the use of the gas of the gas instrument 4.

Specifically, the instrument characteristic extracting section 16 converts the measurement code string into the extracted code string by rewriting the measurement code string according to the following condition α.

Condition α: In a case where a code (previous code) of a measurement flow value obtained at a timing which is one time interval before a timing corresponding to a measurement flow value of an arbitrary code (present code) in a measurement code string is greater than a code which is one code before the previous code, and the previous code is greater than the present code, or a case where the previous code is smaller than the code which is one code before the previous code, and the previous code is smaller than the present code, the present code is determined as the extracted code. If the present code does not satisfy the condition a, the instrument characteristic extracting section 16 overwrites the extracted code stored previously by the present code, in the extracted code string of the converted code information 34.

The present code is defined as a measurement code which is a target to be converted into the extracted code string at a present time, and is changed one by one from a head of the measurement code string. The code which is one code before the previous code and the previous code which are used for comparison using the condition a, are codes stored temporarily in a memory (not shown) as the extracted code string which is in the middle of the conversion.

Figure 12:
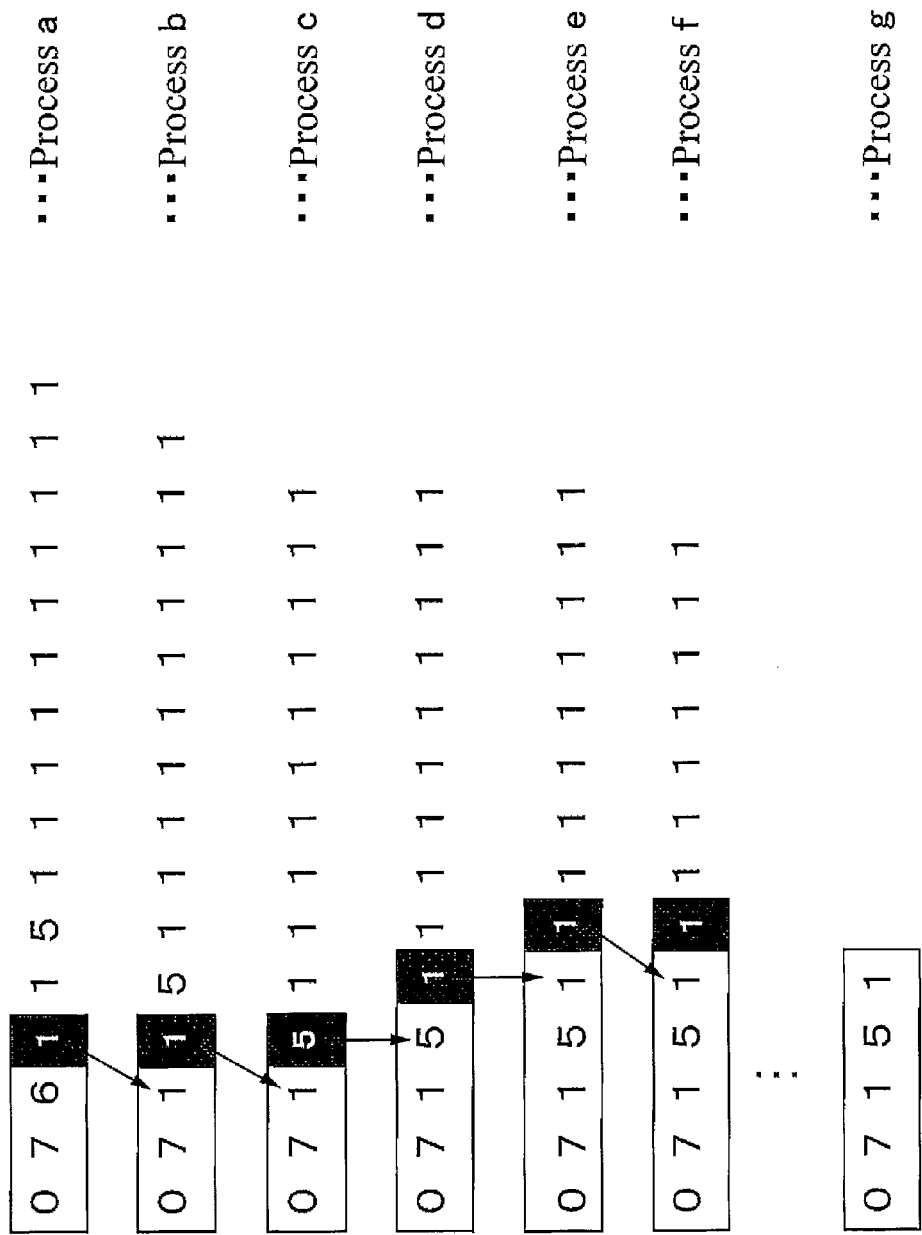
FIG. 12 is a view for explaining an example of conversion processes for converting measurement codes into extracted codes, in the gas meter according to Embodiment 1 of the present invention.

More specifically, as shown in FIG. 5, it is assumed that the measurement code string stored in the converted code information 34 is "0761151111111111". As shown in FIG. 12, the instrument characteristic extracting section 16 temporarily stores in the memory (not show), "0" which is a head of the measurement code string, "7" which comes after "0", and "6" which comes after "7", as the extracted code string.

FIG. 12 is a view for explaining an example of conversion processes for converting measurement codes into extracted codes, in the gas meter 1 according to Embodiment 1 of the present invention. FIG. 12 shows how a data structure of the extracted codes shifts in the conversion processes (process a to process g). The portions delimited by rectangles in FIG. 12 are portions temporarily stored as extracted codes. Codes which are delimited by white patterns, among the portions delimited by rectangles in FIG. 12, are present codes.

Specifically, "0" which is a head of the measurement code string and "7" which comes after "0" are unconditionally stored in the memory (not shown) as the extracted codes because there are no code which is one code before the previous code. With regard to "6" which comes after "7", the previous code "7" is greater than the code "0" which is one code before the previous code "7" and the previous code "7" is greater than the present code "6". Thus, the present code "6" satisfies the condition α and therefore is added as a tail of the code string.

With regard to the present code "1" in a subsequent case, the previous code "6" is smaller than the code "7" which is one code before the previous code "6" but is greater than the present code "1". Thus, the present code "1" does not satisfy the condition α. Therefore, the code "6" located at a tail of the extracted code string is overwritten by the present code "1" (from process a to process b in FIG. 12).

Then, the present code "1" in a subsequent case, does not satisfy the condition α. Therefore, the code "1" located at a tail of the extracted code string in the present stage is overwritten by the present code "1" (from process b to process c in FIG. 12). Then, with regard to the present code "5" in a subsequent case, the previous code "1" is smaller than the code "7" which is one code before the previous code "1" and is smaller than the present code "5". Thus, the present code "5" satisfies the condition a. Therefore, the present code "5" is added as a tail of the extracted code string (from process c to process d in FIG. 12).

Then, the present code "1" in a subsequent case satisfies the condition a. Therefore, the present code "1" is added as a tail of the extracted code string (from process d to process e in FIG. 12). By sequentially executing the above processing, a code string "0, 7, 1, 5, 1" is obtained as the extracted code string as shown in process g in FIG. 12.

Figure 13:
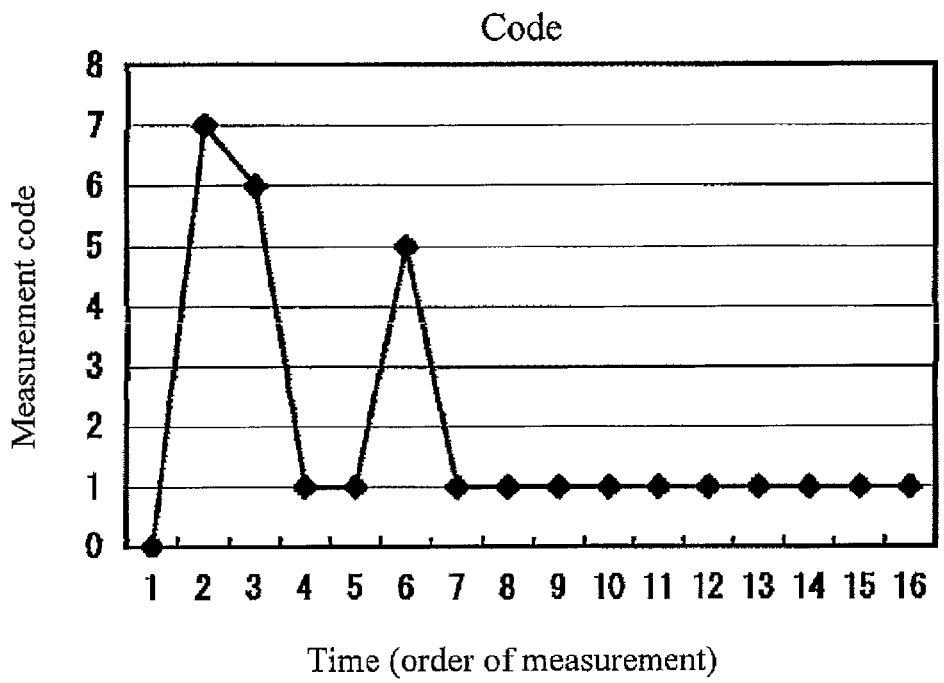
FIG. 13 is a graph showing an example of a time-series change in a measurement code string contained in the converted code information of FIG. 5, in the gas meter according to Embodiment 1 of the present invention.

That is, by converting the time-series change into the measurement flow value into the measurement code string, it can be converted into the information indicating the change pattern of the measurement flow value per unit time (see graph in FIG. 13). FIG. 13 is a graph showing an example of a time-series change in the measurement code string contained in the converted code information 34 of FIG. 5, in the gas meter 1 according to Embodiment 1 of the present invention. In FIG. 13, a vertical axis indicates the measurement code, while a horizontal axis indicates time (order) in which the measurement flow value corresponding to the measurement code is obtained.

Figure 14:
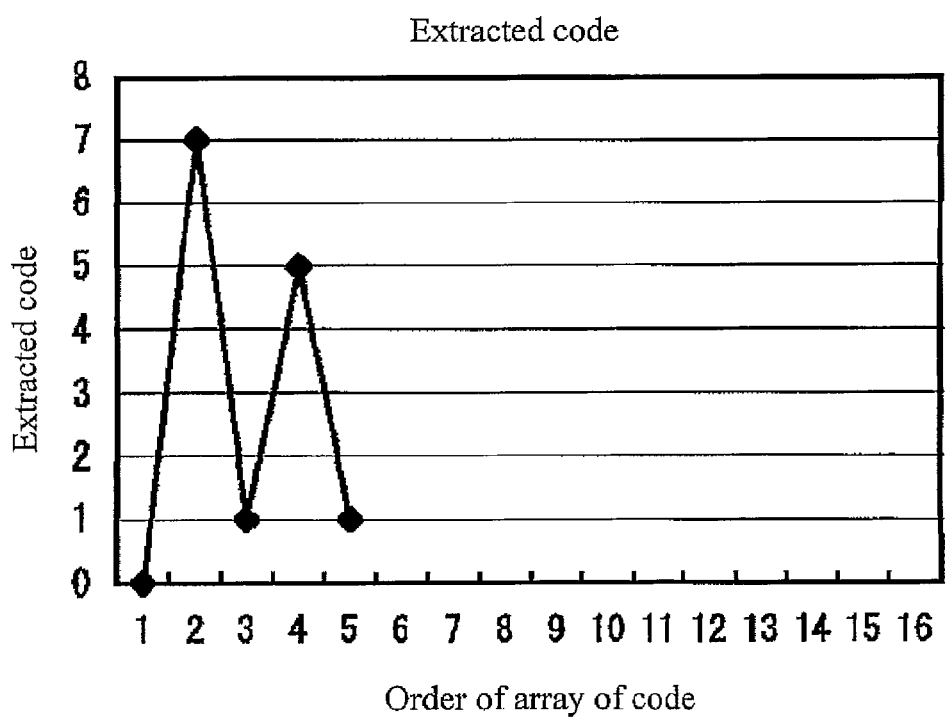
FIG. 14 is a graph showing an example of a result of conversion of measurement codes of FIG. 13 into extracted codes, in the gas meter according to Embodiment 1 of the present invention.

Further, by executing processing for converting the measurement code string into the extracted code string, the graph of FIG. 13 indicating the change pattern of the measurement flow value per unit time can be converted into a graph of FIG. 14 showing information with a compressed volume. FIG. 14 is a graph showing an example of a result of conversion of the measurement codes of FIG. 13 into the extracted codes, in the gas meter 1 according to Embodiment 1 of the present invention. In FIG. 14, a vertical axis indicates the extracted codes, while a horizontal axis indicates the order of the code string stored as the extracted code string (order of array of the codes).

That is, by converting the measurement code string into the extracted code string, it becomes possible to derive the graph (FIG. 14) in which peak values of change points (change point i, change point ii, and change point iii in the graph of FIG. 11) of the measurement flow values shown in FIG. 11 are extracted. FIG. 14 is a graphical representation of the extracted code string. As can be seen from FIG. 14, the characteristic of the gas instrument is extracted adequately, as compared to the graph of the measurement code string of FIG. 13, even though the information volume is compressed in the example of FIG. 14.

After the instrument characteristic extracting section 16 generates the extracted code string as described above, it outputs the extracted codes to the instrument determiner section 15.

The instrument determiner section 15 compares the extracted code string received from the instrument characteristic extracting section 16 to the instrument unique characteristic code string information 32 pre-stored in the instrument unique characteristic code string information preserving section 17. Then, the instrument determiner section 15 determines the kind of the gas instrument 4 using the gas (step S34).

Now, the instrument unique characteristic code string information 32 will be specifically described. Prior to describing the instrument unique characteristic code string information 32, a description will be given of a relationship among the measurement flow value obtained from the gas instrument 4 other than the fuel cell, the measurement code generated from this measurement flow value, and the extracted code generated from this measurement code.

Figures 16, 17:
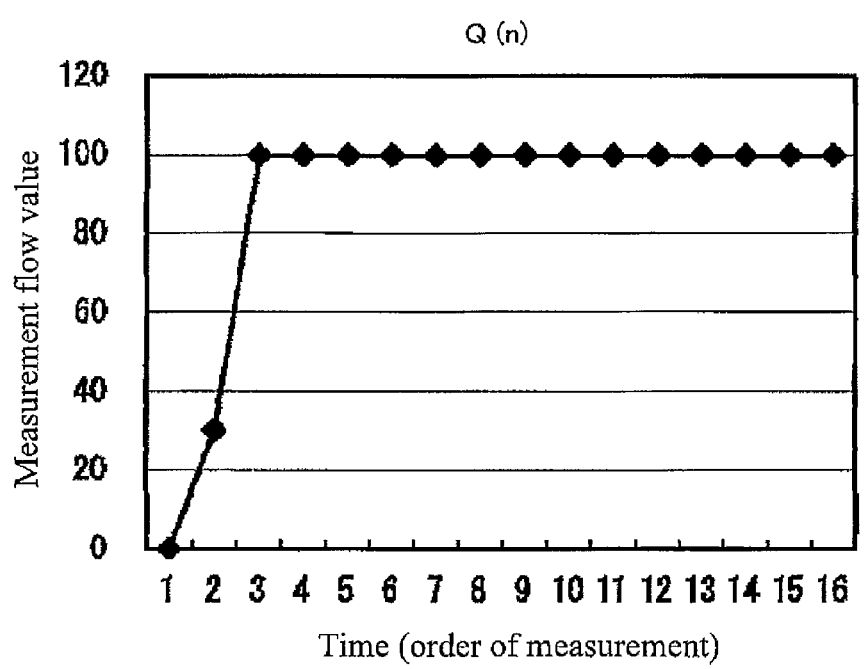
FIG. 16 is a table showing an example of the converted code information stored in the code information preserving section included in the gas meter according to Embodiment 1 of the present invention.
FIG. 17 is a graph showing an example of a time-series change in the measurement flow values obtained in the gas meter according to Embodiment 1 of the present invention.

For example, it is supposed that a gas instrument B (e.g., push-lever type gas table) corresponding any one of the gas instruments 4a to 4c is activated, and at this time, the measurement flow value of the gas flowing through the fluid passage 2 changes as indicated by the table of FIG. 16. FIG. 17 shows a graph showing this change pattern of the gas flow. FIG. 16 is a table showing an example of the converted code information 34 stored in the code information preserving section 23 included in the gas meter 1 according to Embodiment 1 of the present invention. FIG. 17 is a graph showing an example of a time-series change in the measurement flow value obtained in the gas meter 1 according to Embodiment 1 of the present invention.

As shown in the graph of FIG. 17, the measurement flow value changes from the measurement flow value Q(1)=0 L/h to the measurement flow value Q(2)=30 L/h, and thereafter changes with a passage of time.

As the measurement code string generated from the measurement flow values of FIG. 16, "0361111111111111" is obtained. The instrument characteristic extracting section 16 obtains the extracted codes "061" by converting this measurement code string into the extracted codes.

Figure 18:
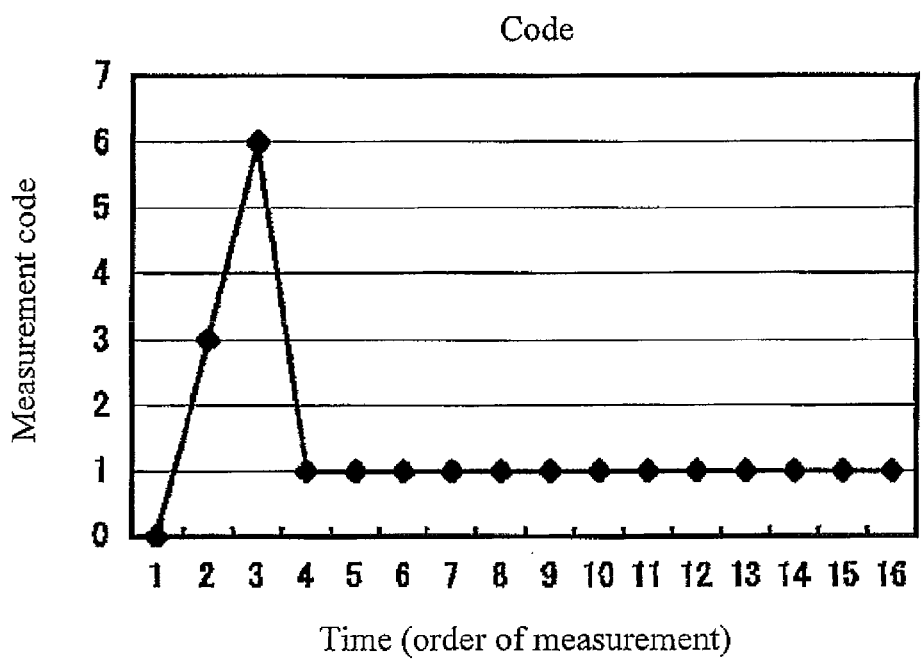
FIG. 18 is a graph showing an example of a time-series change in the measurement code string contained in the converted code information of FIG. 16.
Figure 19:
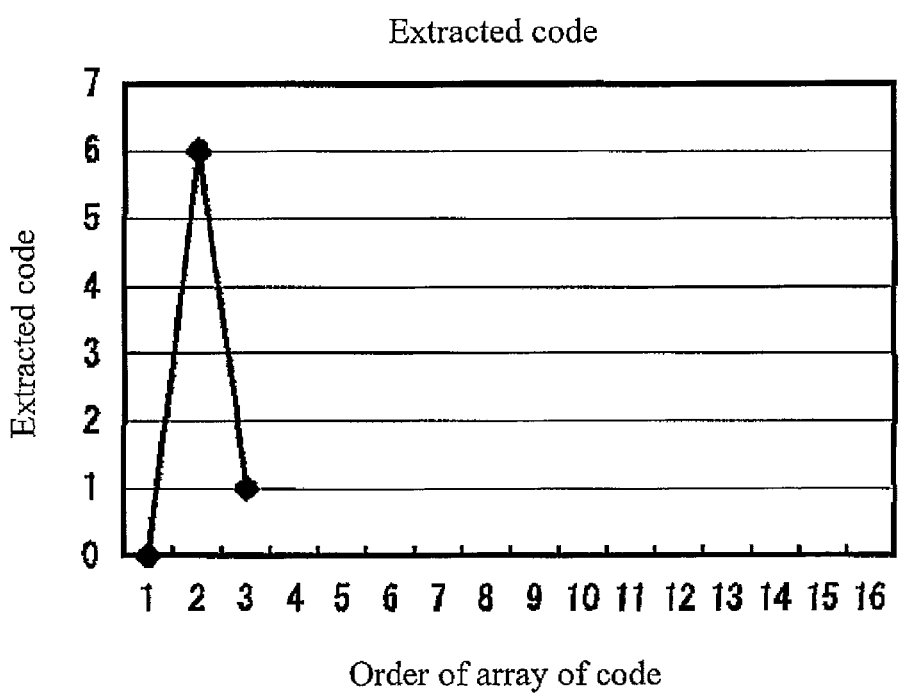
FIG. 19 is a graph showing a result of conversion of measurement codes of FIG. 18 into extracted codes.

The time-series change (measurement code string) in the measurement codes in this case is the graph of FIG. 18. The extracted code string extracted from the measurement code string is shown in FIG. 19. FIG. 18 is a graph showing an example of the time-series change in the measurement code string contained in the converted code information 34 of FIG. 16. In FIG. 18, a vertical axis indicates measurement codes and a horizontal axis indicates time (order) at which measurement flow values corresponding to the measurement codes are obtained. FIG. 19 is a graph showing a result of conversion of the measurement codes of FIG. 18 into the extracted codes. In FIG. 19, a vertical axis indicates the extracted codes and a horizontal axis indicates the order of the codes stored as the extracted code string.

Now, a comparison between the extracted code string of the gas instrument A and the extracted code string of the gas instrument B will be made. Two peaks appear in the extracted code string of the gas instrument A, i.e., in the graph of FIG. 14, whereas only one peak appears in the extracted code string of the gas instrument B, i.e., in the graph of FIG. 19. That is, ignition of the gas instrument A (gas fan heater) is performed by slow ignition, and the gas flow is fixed in the middle of rising at a time point of starting of activation of the gas instrument A and before the gas flow reaches a stabilized state. The state in which the gas flow is fixed in the middle is not the characteristic of all of the gas instruments 4 but is the characteristic of the limited gas instrument 4 such as the gas fan heater. Therefore, this characteristic change pattern of the gas flow is captured from the time-series change in the gas flow, and thus, the gas instrument 4 such as the gas fan heater can be distinguished from the gas instrument B (push-lever type gas table).

Accordingly, in the gas meter 1 of the present embodiment, the instrument unique characteristic code string information 32 is pre-stored in the instrument unique characteristic code string information preserving section 17 such that the instrument unique characteristic code string indicating a characteristic change pattern of the gas flow corresponding to the kind of the gas instrument 4, i.e., a rising characteristic unique to the gas instrument corresponds to the kind of the gas instrument 4. Then, if there exists instrument unique characteristic code string which is the same as or similar to the extracted codes generated from the actually obtained measurement flow values, it is determined that the gas instrument 4 corresponding to this instrument unique characteristic code string is using the gas.

If the extracted code string obtained in the gas meter 1 is "07151", the instrument determiner section 15 determines that the gas instrument 4 which has started using the gas is the gas instrument A (gas fan heater). Or, if the instrument characteristic code string obtained in the gas meter 1 is "061", the instrument determiner section 15 determines that the gas instrument 4 which has started using the gas is the gas instrument B (e.g., push-lever type gas table).

As described above, the gas meter 1 of Embodiment 1 is configured to execute the fuel cell determination process before the individual instrument determination process. Therefore, in the gas meter 1, when the fuel cell determiner section 14 determines that the gas instrument 4 which has started using the gas is the fuel cell, the individual instrument determination process may be omitted, and the process for determining the gas instrument 4 using the gas can be simplified. In addition, it can be accurately determined whether or not the gas instrument 4 using the gas is the fuel cell.

As described above, in Embodiment 1, it is determined whether or not the gas instrument 4 using the gas is the fuel cell, depending on whether or not the conditions A and B are satisfied. Hereinafter, a description will be given of an embodiment (Embodiment 2) for more accurately determining whether or not the gas instrument 4 using the gas is the fuel cell, based on a more strict determination criterion.

Embodiment 2

By the way, the flow of the gas supplied to the gas instrument 4 is adjusted automatically for each gas instrument 4. However, an amount of the gas supplied to the gas instrument 4 is adjusted manually in some cases. In a case where the amount of the gas supplied to the gas instrument 4 is adjusted manually in this way, there is a possibility that it cannot be determined whether or not the gas instrument 4 using the gas is the fuel cell, in the case of using only the conditions A and B. Accordingly, in the gas meter 1 of Embodiment 2, the following condition C is added so that an influence provided manually is excluded and thereby it can be more accurately determined whether or not the gas instrument 4 using the gas is the fuel cell. The fuel cell determiner section 14 determines whether or not the gas instrument 4 using the gas is the fuel cell, depending on whether or all of the conditions A to C are satisfied.

The gas meter 1 of Embodiment 2 is the same as the gas meter 1 of Embodiment 1 except that the fuel cell determiner section 14 determines whether or not the gas instrument 4 using the gas is the fuel cell, depending on whether or the conditions A to C are satisfied. Therefore, the components included in the gas meter 1 will not be descried in repetition.

Condition C: A sum of the difference values found using the condition B is equal to or less than a fourth predetermined value (e.g., 20 L/h). The fourth predetermined value is determined based on a changing magnitude of the flow value of the gas used in the fuel cell, during a period in which the determination target flow value is measured.

Figure 20:
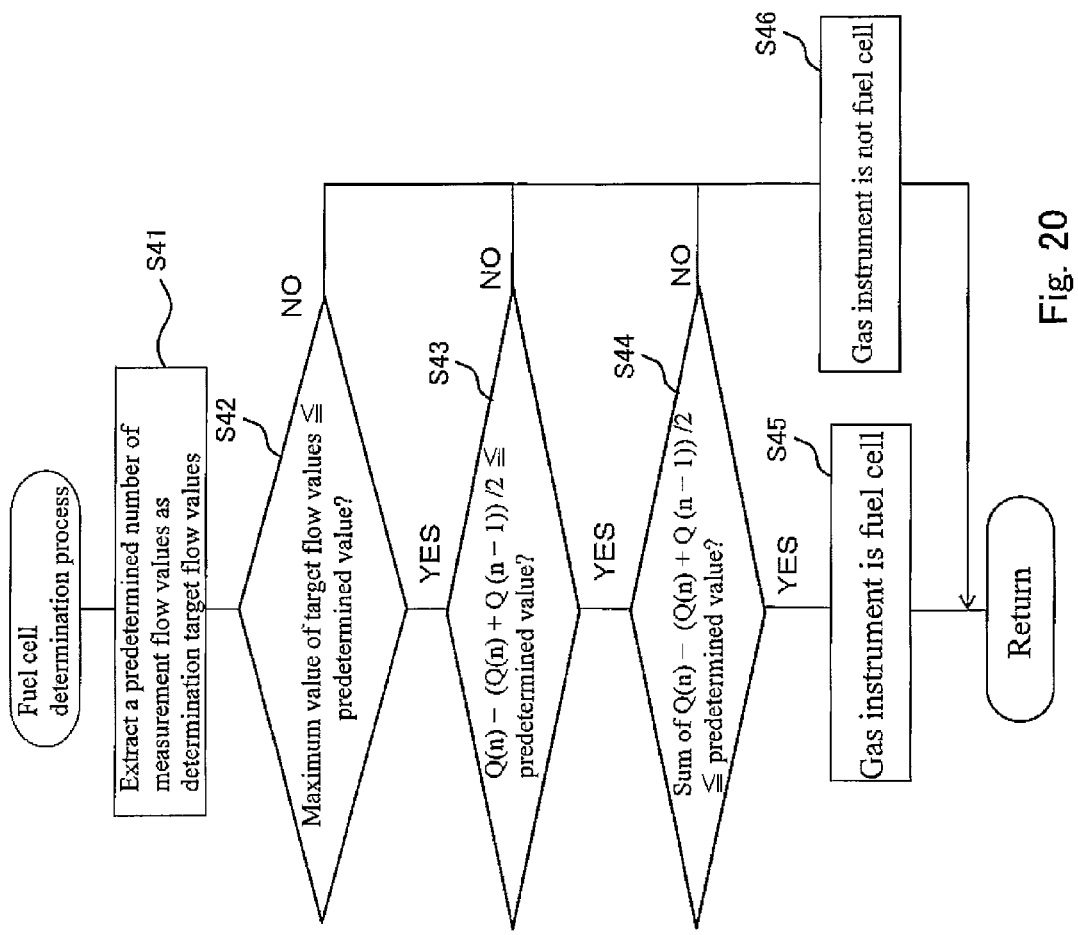
FIG. 20 is a flowchart showing an example of a fuel cell determination process executed by a gas meter according to Embodiment 2 of the present invention.
Figure 21:
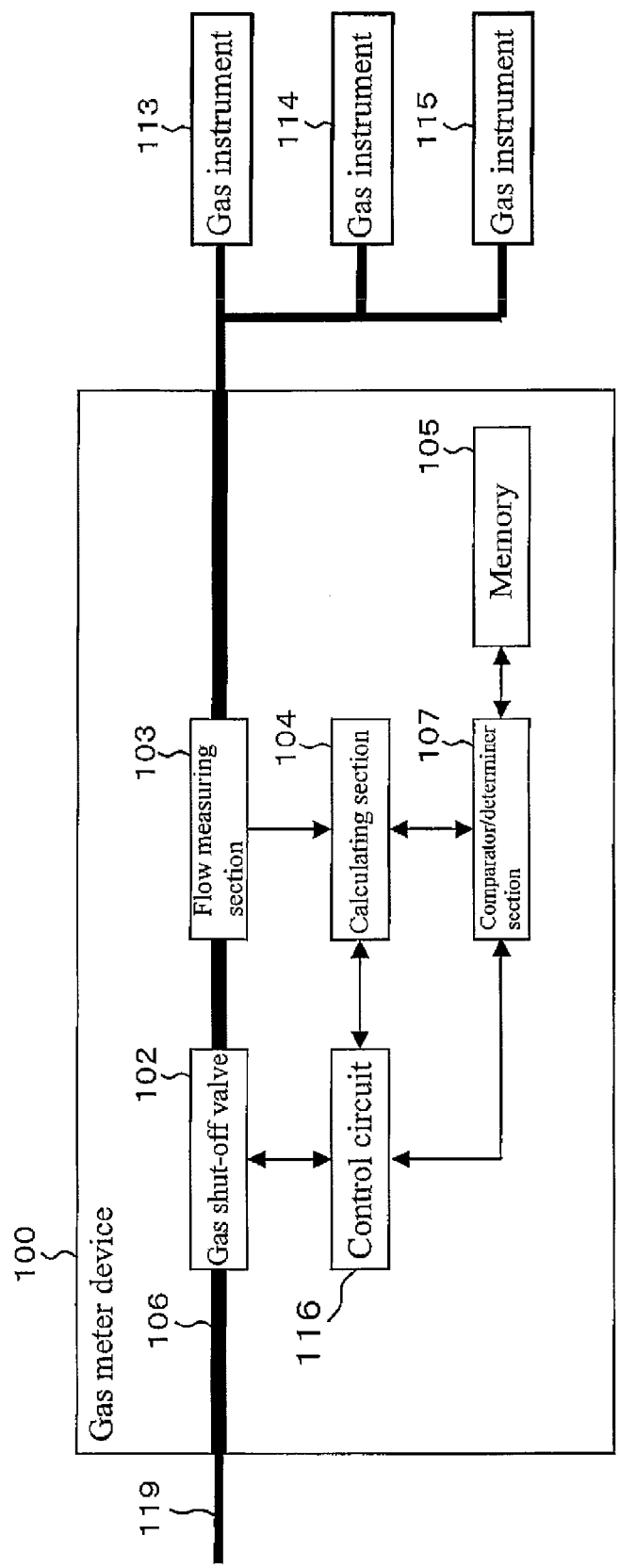
FIG. 21 is a block diagram showing a schematic configuration of a gas meter device according to a prior art.
Figure 22:
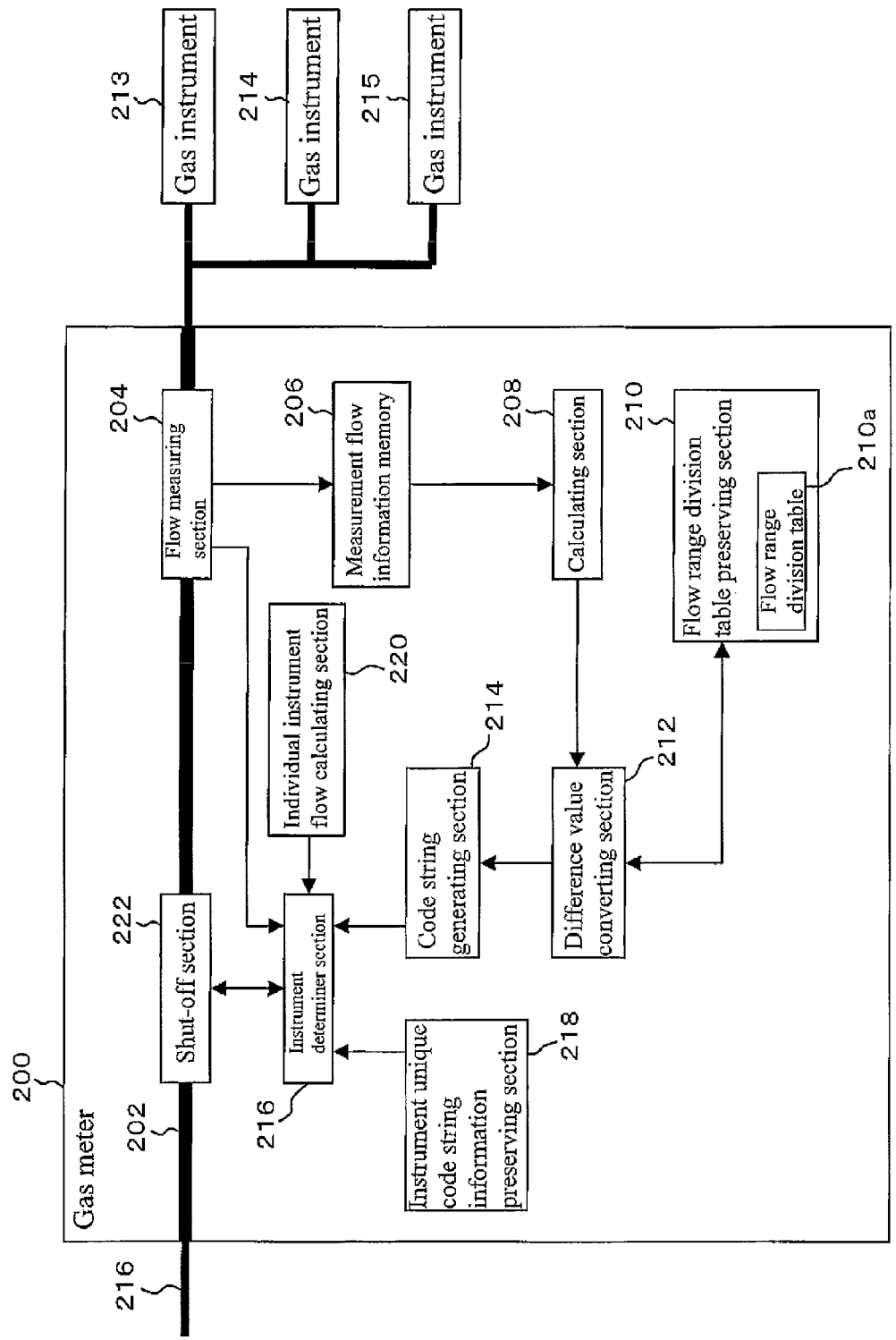
FIG. 22 is a block diagram showing a schematic configuration of a gas meter device according to a prior art.

Next, a description will be given of the fuel cell determination process in the gas meter 1 of Embodiment 2, with reference to FIG. 20. FIG. 20 is a flowchart showing an example of the fuel cell determination process executed by the gas meter 1 according to Embodiment 2 of the present invention.

Like the gas meter 1 of Embodiment 1, initially, the flow measuring section 12 measures the measurement flow value (absolute flow value) Q(n) of the gas flowing through the fluid passage 2 at specified time intervals (e.g., intervals of 0.5 second), and stores the measurement flow value as the flow data information 31 in the measurement flow memory 13.

Step S41 to step S43 are the same as step S21 to step S23 of Embodiment 1 and will not be described.

In step S43, the fuel cell determiner section 14 determines whether or not the condition B is satisfied, and further determines whether or not the condition C is satisfied, when the condition B is satisfied. That is, the fuel cell determiner section 14 determines whether or not a sum of difference values each of which is derived by subtracting from an arbitrary (n-th) determination target flow values Q(n) of all of the determination target flow values, a moving average (e.g., secondary moving average) of the arbitrary (n-th) determination target flow value Q(n) and a predetermined number of measurement flow values obtained before this arbitrary determination target flow value Q(n), is equal to or less than the fourth predetermined value (e.g., 20 L/h).

That is, the fuel cell determiner section 14 determines whether or not a sum of $Q(n)-(Q(n)+Q(n-1))/2 \leq$ predetermined value (20 L/h) (step S44).

For example, in the example of FIG. 9, difference values each of which is derived by subtracting from an arbitrary (n-th) measurement flow value Q(n), a moving average of this measurement flow value Q(n) and a predetermined number of measurement flow values obtained before this measurement flow value Q(n), are 1.945, 2.600, 2.635 . . . sequentially from n=3. A sum of the difference values of n=3 to n=21 is 18.679, which is equal to or less than 20 L/h. Therefore, the condition C is satisfied ("YES" in step S44).

If "YES" in step S44, the fuel cell determiner section 14 determines that the gas instrument 4 using the gas is the fuel cell (step S45). On the other hand, if any one of the condition A, the condition B and the condition C is not satisfied, the fuel cell determiner section 14 determines that the gas instrument 4 using the gas is not the fuel cell (step S46).

As described above, the gas meter 1 of Embodiment 2 is configured to determine that the gas instrument 4 using the gas is the fuel cell only when the three conditions are satisfied. That is, by adding the condition C, the characteristic change pattern of the gas flow, i.e., change pattern of the gas flow which increases gradually, which is observed at a time point of starting of activation of the fuel cell, can be determined using a more strict criterion. Because of this, even when the gas instrument 4 which satisfies the condition A and the condition B but is not the fuel cell is included in gas instruments 4 which possibly use the gas, the fuel cell can be identified.

Specific configurations of the fuel cell determiner section 14, the instrument determiner section 15, the instrument characteristic extracting section 16, the difference value converting section 18, and the difference value calculating section 20, which are included in the gas meter 1 according to Embodiment 1 or 2 are not particularly limited, but may be configured as a known logic circuit or the like including a switching element, a subtractor, a comparator, etc. Or, they may be implemented by an operation of a CPU or the like which reads programs stored in a memory (not shown) and executes the programs.

The measurement flow memory 13, the instrument unique characteristic code string information preserving section 17, the flow range division table preserving section 19, and the code information preserving section 23, which are included in the gas meter 1 according to Embodiment 1 or 2, may be such that, for example, a control section such as the CPU reads various information stored. For example, these sections may be a main memory connected to the CPU via a memory bus, or a secondary memory such as a hard disc which is accessed using an input/output channel.

In the gas meter 1 according to Embodiment 1, 2, the ultrasonic flow meters are used as the flow measuring section 12. However, it is obvious that the same advantages can be achieved by another instantaneous flow meter device using the sampling signal, which operates as the flow measuring section 12. Although processing executed after the instrument determination process in the gas meter 1 according to Embodiment 1, 2 is not described, for example, the following processing may be executed using a result of the determination in the instrument determination process.

Using the result of the determination in the instrument determination process, the gas meter 1 may measure an accumulated flow for each of the gas instruments 4a to 4c, or each of specified groups into which the gas instruments 4a to 4c are classified, or may calculate fee for each of the gas instruments 4a to 4c, or each of the specified groups based on a result of the measurement. Or, it is obvious that the gas meter 1 can be set such that an individual instrument security system carries out safe management (security function) for each of the gas instruments 4a to 4c, or each of the specified groups.

Moreover, it is obvious that the gas meter 1 and the gas instrument 4 may include, for example, transmission/reception sections such as radio (wireless) units so that the gas meter 1 can confirm whether or not the gas instrument 4 is using the gas, which can further improve an accuracy with which the gas instrument 4 using the gas is determined.

In the gas meter 1 according to Embodiment 1, 2, the fuel cell determiner section 14 executes the fuel cell determination process by utilizing 22 measurement flow values stored as the flow data information 31 in the measurement flow memory 13. Alternatively, the fuel cell determiner section 14 may execute the fuel cell determination process for the measurement flow value every time the flow measuring section 12 measures the measurement flow value. Then, the fuel cell determiner section 14 may determine that the gas instrument 4 using the gas is the fuel cell only in the case where the determination target flow values from the firstly measured flow value to the lastly measured flow value satisfy the condition A, the condition B and the condition C.

In the gas meter 1 according to Embodiment 1, 2, when the individual instrument determination process is executed, the measurement code obtained by converting the difference value of the measured flow value is converted into the extracted code. And, in the gas meter 1, the instrument determiner section 15 compares the extracted code to the instrument unique characteristic code string information 32 pre-stored in the instrument unique characteristic code string information preserving section 17, to determine the gas instrument 4 using the gas.

However, the individual instrument determination process executed by the gas meter 1 is not limited to this. For example, difference values indicating typical change pattern of gas flow values at a time point of starting of activation of the gas instrument 4 are pre-stored in the instrument unique characteristic code string information preserving section 17, for each kind of the gas instrument 4. Then, the instrument determiner section 15 compares the difference value of the measured flow value to the difference value indicating the change pattern, to determine the gas instrument 4 using the gas, etc., based on its analogous relationship, etc.

Thus far, Embodiment 1 and Embodiment 2 have been described. The present invention is not limited to matters recited in these embodiments. Changes and applications made by those skilled in the art based on the disclosure of specification and well-known techniques are anticipated by the present invention and are within a scope to be protected.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

INDUSTRIAL APPLICABILITY

As should be appreciated from the above, a flow meter device of the present invention is capable of extracting a characteristic of an instrument and therefore is applicable to identification of each of used instruments connected at a downstream side of the flow meter device or grouping therefor in the same manner, in industrial flow meters or tap water meters.

The invention claimed is:

1. A flow meter device for measuring a flow value of a fluid used in an instrument, comprising:
   a flow measuring section for measuring the flow value of the fluid flowing through a fluid passage connected to the instrument at each specified time interval;
   a flow memory for storing the flow value of the fluid which is measured by the flow measuring section; and
   a fuel cell determiner unit for determining that the instrument using the fluid is a fuel cell, when a condition A and a condition B are satisfied, in which
   the condition A is such that a maximum value of determination target flow values is equal to or less than a second predetermined value, the determination target flow values being a predetermined number of flow values measured before and after a reference flow value which is equal to or greater than a first predetermined value and is closest to the first predetermined value, the determination target flow values being included in flow values stored in the flow memory, and
   the condition B is such that a difference value derived by subtracting from each of the determination target flow values, an average value found from the each determination target flow value and a predetermined number of measurement flow values measured before the each determination target flow value, is equal to or less than a third predetermined value;
   wherein the first predetermined value is determined so as to exclude the flow value of the fluid flowing through the fluid passage for a different factor, from the flow values of the fluid flowing through the fluid passage according to a change pattern corresponding to a kind of instrument, at a time point of starting of activation of the gas instrument,
   the second predetermined value in the condition A is determined based on a maximum value of the flow values of a usage amount of the fuel cell per unit time, and
   the third predetermined value in the condition B is determined based on a changing magnitude of the flow value of the fluid used in the fuel cell, at each specified time interval.

2. The flow meter device according to claim 1, wherein the fuel cell determiner unit determines that the instrument using the fluid is a fuel cell, when a condition C in addition to the condition A and the condition B are satisfied, the condition C being such that a sum of the difference values found using the condition B is equal to or less than a fourth predetermined value, and
   the fourth predetermined value is determined based on the changing magnitude of the flow value of the fluid used in the fuel cell, during a period in which the determination target flow values are measured.

3. The flow meter device according to claim 1, further comprising:
   an instrument unique information memory for storing instrument unique information which is information indicating a change pattern corresponding to a kind of the instrument, of the flow value of the fluid used at a time point of starting of activation of the instrument;
   a change pattern information generating unit for generating change pattern information indicating the change pattern of the flow values stored in the flow memory, when the fuel cell determiner unit determines that the instrument using the fluid is not the fuel cell; and
   an instrument determiner unit for determining the kind of the instrument using the fluid by comparing the instrument unique information stored in the instrument unique information memory, to the change pattern information generated by the change pattern information generating unit.

4. A method of controlling a flow meter device for measuring a flow value of a fluid used in an instrument, the flow meter device including a flow memory for storing the measured flow value, the method comprising:
- a first step of measuring the flow value of the fluid flowing through a fluid passage connected to the instrument at each specified time interval; and
- a second step of storing the flow value measured in the first step, in the flow memory; and
- determining that the instrument using the fluid is a fuel cell, when a condition A and a condition B are satisfied, in which
- the condition A is such that a maximum value of determination target flow values is equal to or less than a second predetermined value, the determination target flow values being a predetermined number of flow values measured before and after a reference flow value which is equal to or greater than a first predetermined value and is closest to the first predetermined value, the determination target flow values being included in the flow values stored in the flow memory in the second step, and
- the condition B is such that a difference value derived by subtracting from each of the determination target flow values, an average value found from the each determination target flow value and a predetermined number of measurement flow values measured before the each determination target flow value, is equal to or less than a third predetermined value;
- the first determined value is determined so as to exclude the flow value measured during a period in which the fluid flows through a fluid passage for a factor other than the fluid supplied according to a change pattern of the flow value corresponding to a kind of the instrument at a time point of starting of activation of the instrument,
- the second predetermined value in the condition A is determined based on a maximum value of the flow values of a usage amount of the fuel cell per unit time, and
- the third predetermined value in the condition B is determined based on a changing magnitude of the flow value of the fluid used in the fuel cell, at each specified time interval.

* * * * *